US010573423B2

(12) United States Patent
Poole et al.

(10) Patent No.: US 10,573,423 B2
(45) Date of Patent: Feb. 25, 2020

(54) THERMAL VOLUME REDUCTION OF RADIOACTIVE WASTES

(71) Applicant: Atkins Energy Global Solutions, LLC, Columbia, SC (US)

(72) Inventors: Scott D. Poole, Swansea, SC (US); Lu Liu, Swansea, SC (US); Timothy Milner, Lexington, SC (US)

( * ) Notice: Subject to any disclaimer, the term of this patent is extended or adjusted under 35 U.S.C. 154(b) by 267 days.

(21) Appl. No.: 15/815,201

(22) Filed: Nov. 16, 2017

(65) Prior Publication Data

US 2018/0137946 A1    May 17, 2018

Related U.S. Application Data

(60) Provisional application No. 62/422,990, filed on Nov. 16, 2016.

(51) Int. Cl.
*G21F 9/30* (2006.01)

(52) U.S. Cl.
CPC ..................... *G21F 9/30* (2013.01)

(58) Field of Classification Search
CPC ..... G21F 9/30; G21F 9/14; G21F 9/32; G21F 9/06; G21F 9/00; G21F 9/12; G21K 1/00; C02F 1/70; C10J 3/52; F23G 5/30
USPC .......................................................... 588/19
See application file for complete search history.

(56) References Cited

U.S. PATENT DOCUMENTS

| | | | |
|---|---|---|---|
| 5,909,654 A | 6/1999 | Hesbol et al. |
| 6,084,147 A | 7/2000 | Mason |
| 6,240,985 B1 | 6/2001 | Mason |
| 6,280,694 B1 | 8/2001 | Mason |
| 6,896,856 B2 | 5/2005 | Sobolev et al. |
| 7,011,800 B1 | 3/2006 | Mason |
| 7,125,531 B1 | 10/2006 | Mason |
| 7,476,194 B2 | 1/2009 | Mason et al. |
| 7,491,861 B2 | 2/2009 | Mason |
| 7,531,152 B2 | 5/2009 | Mason |
| 7,763,219 B2 | 7/2010 | Mason |
| 2004/0022697 A1 | 2/2004 | Sobolev et al. |
| 2013/0123564 A1 | 5/2013 | Mason |
| 2015/0240170 A1 | 8/2015 | Kurkela et al. |
| 2016/0379727 A1 | 12/2016 | Mason |

FOREIGN PATENT DOCUMENTS

| | | |
|---|---|---|
| EP | 1121691 | 4/2009 |
| EP | 1225973 | 5/2011 |
| JP | 2014016191 A | 1/2014 |

OTHER PUBLICATIONS

International Search Report and Written Opinion Issued in Corresponding PCT Application No. PCT/US2017/062042, dated Mar. 13, 2018.
Mason et al., "THOR Steam Reforming Technology for the Treatment of Ion Exchange Resins and More Complex Wastes such as Fuel Reprocessing Wastes," ASME 13th International Conference on Environmental Remediation and Radioactive Waste Management, ICEM2010-40165, Oct. 3-7, 2010, Tsukuba, Japan.
Mason et al., "THOR Steam Reforming Technology for the Treatment of Complex and Problematic Wastes," ASME 2011 14th International Conference on Environmental Remediation and Radioactive Waste Management, ICEM2011-59084, Sep. 25-29, 2011, Reims, France.
"THOR Steam Reforming Process for Hazardous and Radioactive Wastes Technology Report," THOR Treatment Technologies, LLC, TR-SR02-1, Rev. 1, PDF file created date of Jun. 17, 2003, Richland, WA, United States.
"Application of Thermal Technologies of Processing of Radioactive Waste," IAEA, International Atomic Energy Agency, IAEA-TECDOC-1527, Dec. 2006.
International Search Report and Written Opinion for PCT International Application No. PCT/US2017/062042, dated Mar. 13, 2018 (14 pp.).

*Primary Examiner* — Edward M Johnson
(74) *Attorney, Agent, or Firm* — Norton Rose Fulbright US LLP

(57) ABSTRACT

A method for thermal volume reduction of waste material contaminated with radionuclides includes feeding the waste material into a fluidized bed reactor, injecting fluidizing gas into the fluidized bed reactor to fluidize bed media in the fluidized bed reactor, and decomposing the waste material in the fluidized bed reactor. A system for thermal volume reduction of the waste material includes one or more of a feedstock preparation and handling system, a fluidized bed reactor system, a solids separation system, and an off-gas treatment system. The method and system may be used to effectively reduce the volume or radioactive wastes generated from the operation of nuclear facilities such as nuclear power plants including wastes such as spent ion exchange resin, spent granular activated carbon, and dry active waste. The majority of the organic content in the waste material is converted into carbon dioxide and steam and the solids, including the radionuclides, are converted into a waterless stable final product that is suitable for disposal or long-term storage.

22 Claims, 13 Drawing Sheets

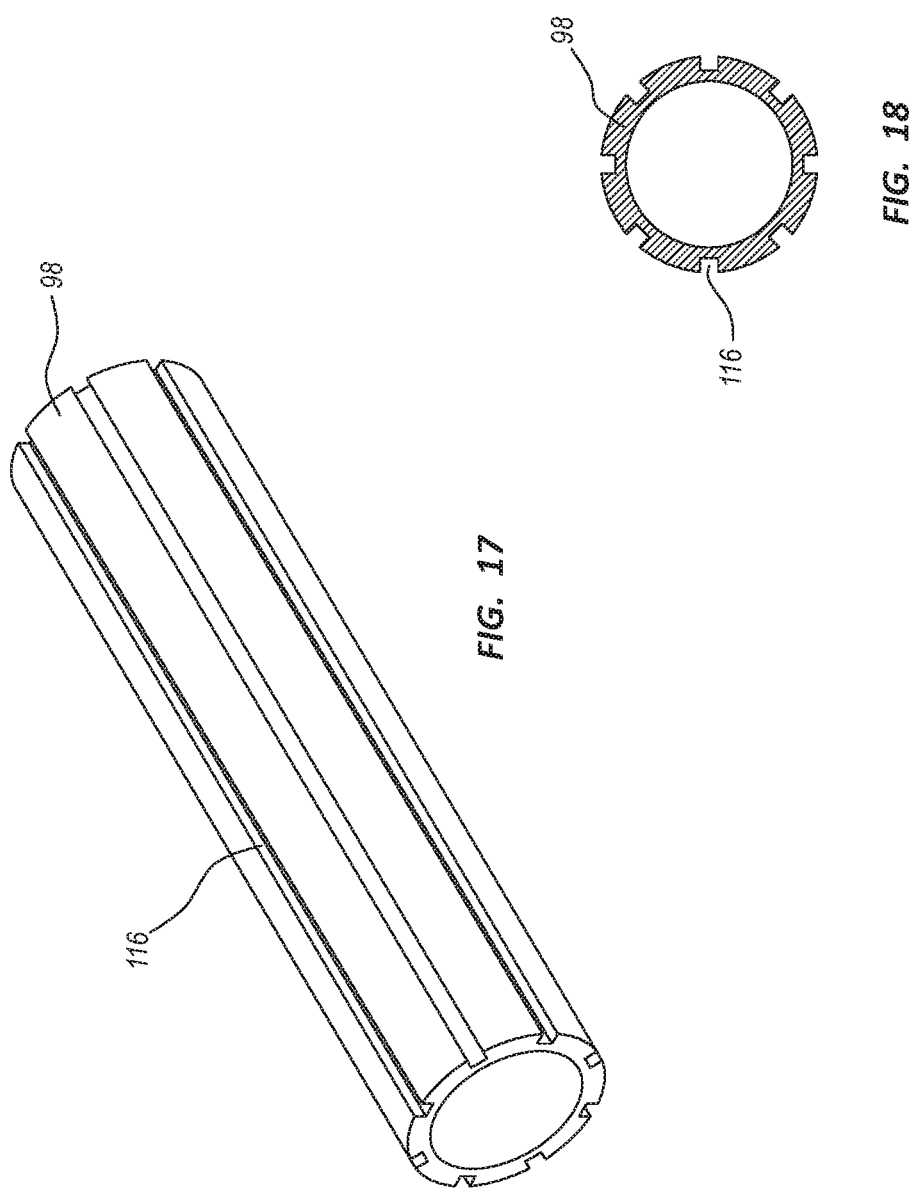

THERMAL VOLUME REDUCTION OF RADIOACTIVE WASTES

BACKGROUND

Long-term storage and/or disposal of radioactive waste is expensive. One way to reduce the cost and better utilize available storage and disposal space is to reduce the volume of the radioactive waste. Most radioactive waste includes large quantities of non-radioactive material, especially organic matter. This material may be removed and/or transformed into a more compact form to reduce the volume of the waste.

Thermal processing is one of the best ways to reduce the volume of waste. It may reduce the volume of wastes to levels that are not attainable using other methods. One common thermal processing method is incineration. It has been used for volume reduction in the municipal waste industry for decades.

Unfortunately, incineration has a number of drawbacks. One is that the reaction occurs at high temperatures in an oxygen-rich environment that facilitates the formation of dioxin and furan compounds, which are subject to heavy and increasing regulatory restrictions. Another is that the high temperature conditions volatilize radionuclides having relatively low boiling points such as cesium and technetium. These materials must be removed in downstream processes, which increases the complexity and cost of the process. The drawbacks have limited the application of incineration in the nuclear industry.

Steam reforming is one approach for the thermal volume reduction of organic matter in radioactive waste that has gained some traction in recent years. In a steam reforming process, the radioactive waste is fed into one or two fluidized bed reformers which are maintained at moderate temperatures and near ambient pressures to effect controlled oxidation and reduction reactions of the radioactive waste. The process allows for complete evaporation of water from the waste, destruction of organics, and conversion of nitrates into nitrogen gas without volatilizing radionuclides.

Although conventional steam reforming process have experienced some level of success and commercial acceptance, they still have a number of disadvantages. One disadvantage is that they require the addition of a solid combustible material to the reactor to provide energy for the pyrolysis and steam reforming reactions. The addition of this material increases the cost of the process and potentially reduces the degree of volume reduction due to the introduction of solid impurities in the material. Another disadvantage is that they generally cannot co-process different waste streams such as dry active waste (DAW), spent ion exchange resin (IER), and the like.

It would be desirable to have an integrated thermal process that may effectively process different waste streams to simplify and facilitate waste processing. It would be especially desirable for waste streams such as DAW and spent IER that differ substantially in their quantities and physical characteristics.

SUMMARY

A system and integrated processing method are disclosed for the conversion and volume reduction of radioactive wastes generated from the operation of nuclear power plants, including spent ion exchange resin (IER), spent granular activated carbon (GAC), dry active waste (DAW) and chemical liquids that normally are incompatible with the plant liquid waste processing system. process uses a single fluidized bed reactor that may be configured to process the spent IER, the spent GAC, or DAW, either alone or in combination with each other thereby providing a "one-stop" solution for nuclear facilities.

The system includes a feedstock preparation and handling system, a fluidized bed reactor system, a solids separation system, and an off-gas treatment system. Volume reduction is achieved via a complex reaction network in the reactor system, including pyrolysis, steam reforming, oxidation, etc. An additive may be added to the reactor system to advance the reaction and stabilize the waste. The process may effectively reduce the volume of the radioactive wastes and convert it into a waterless stable final product that is suitable for disposal or long-term storage. The majority of the organic content of the waste is converted into $CO_2$ and steam making the gaseous emissions environmentally benign.

In some embodiments, the process may include processing dewatered waste material such as dewatered spent IER and/or dewater spent GAC in fluidized bed reactor. The dewatered waste material may also be co-processed with other dry radioactive waste such as DAW to produce a homogenous final waste product. Dewatering the waste material is advantageous because it allows it to be fed into the fluidized bed reactor at lower feed rates than are possible for a slurry. This enables the relatively small amount of dewatered waste material produced by a nuclear facility to be continuously co-processed with the relatively large amount of DAW produced by the facility.

The summary is provided to introduce a selection of concepts in a simplified form that are further described below in the detailed description. The summary and the background are not intended to identify key concepts or essential aspects of the disclosed subject matter, nor should they be used to constrict or limit the scope of the claims. For example, the scope of the claims should not be limited based on whether the recited subject matter includes any or all aspects noted in the summary and/or addresses any of the issues noted in the background.

DRAWINGS

The preferred and other embodiments are disclosed in association with the accompanying drawings in which:

FIGS. 17-18 show a perspective view and a cross-sectional view, respectively, of the thermal core of the feed adapter device in FIG. 13.

DETAILED DESCRIPTION

A system and process are disclosed that may be used to thermally decompose waste material contaminated with radionuclides. Specifically, the system and process may be used to decompose organic matter in the waste material and thereby reduce the volume and mass of the final waste product. This reduces the cost for long-term storage and/or disposal of the radioactive waste.

Figure 1:
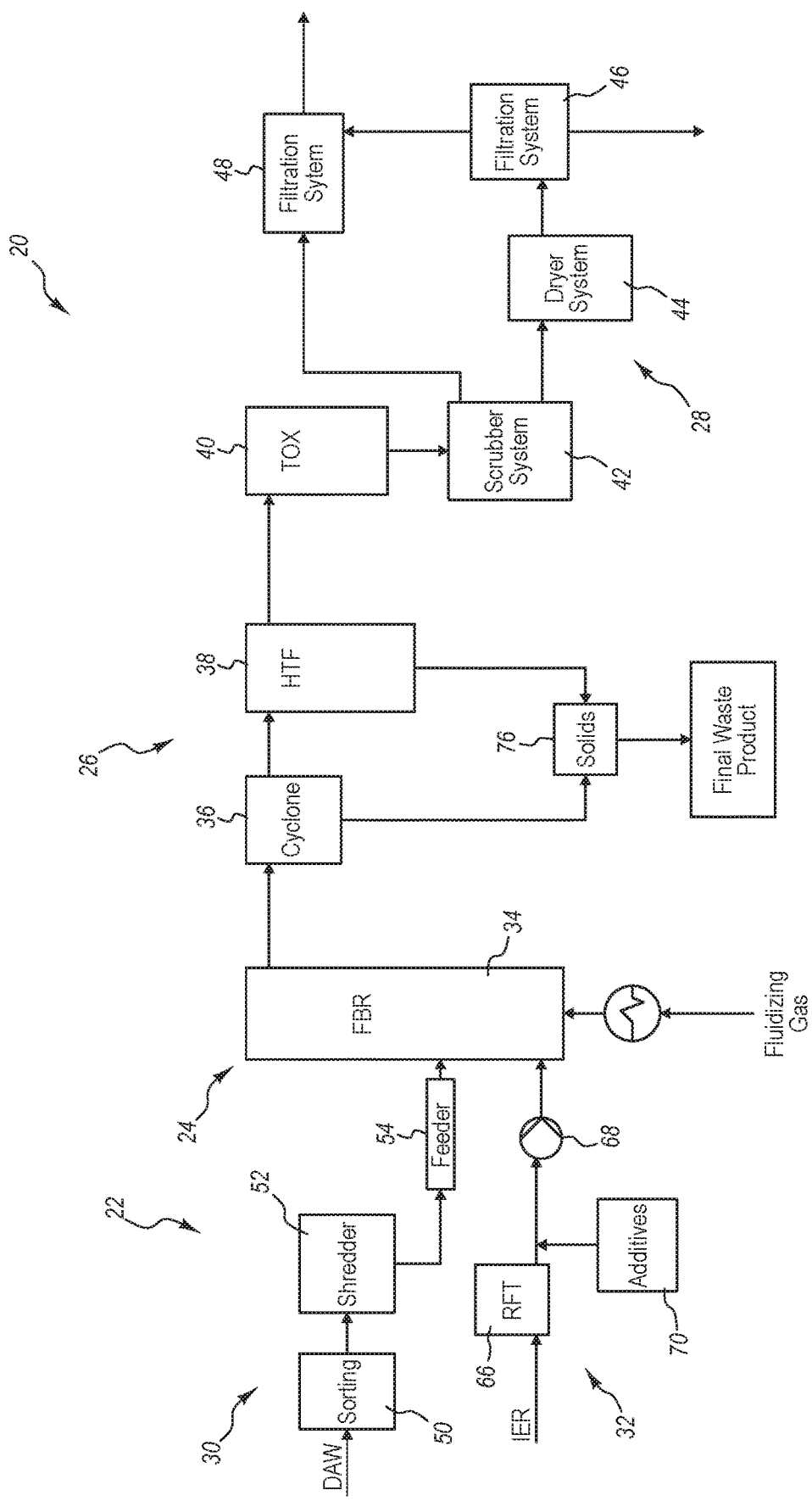
FIG. 1 is a process flow diagram of one embodiment of a process for steam reforming waste contaminated with radionuclides.

FIG. 1 is a process flow diagram of one embodiment of a process that may be used to thermally reduce the volume of radioactive waste. In general, the process is a steam reforming process that relies on pyrolysis using steam and which may be optionally be supplemented with oxygen to maintain the desired temperature in the reactor. The process is carried out by a system 20 comprising a feedstock preparation and handling system 22, a fluidized bed reactor system 24, a solids separation system 26, and an off-gas treatment system 28.

The feedstock preparation and handling system 22 includes a dry active waste (DAW) feeding system 30 and a spent ion exchange resin (IER) feeding system 32. The fluidized bed reactor system 24 includes a fluidized bed reactor 34. The solids separation system 26 includes a cyclone 36 and a high-temperature filter 38. The off-gas treatment system 28 includes a thermal oxidizer 40, a scrubber 42, a dryer system 44, and filtration systems 46, 48.

It should be appreciated that numerous changes may be made to the system 20 and its subsystems 22, 24, 26, 28. For example the feedstock preparation and handling system 22 may include a single feeding system for DAW, spent IER, spent granular activated carbon (GAC) or any other type of radioactive waste. The feedstock preparation and handling system 22 may also include more than the two feeding systems shown in FIG. 1. Likewise, the fluidized bed reactor system 24 may also include multiple fluidized bed reactors positioned in series, parallel, or both. The solids separation system 26 may also include more less separation units than the two shown in FIG. 1. It may also include different types of separation units.

The process may be used to treat any suitable radioactive waste material. In some embodiments, it may be used to treat low and intermediate-level radioactive waste. In other embodiments, it may be used to treat radioactive waste generated by commercial nuclear power plants. In yet other embodiments, the process may be used to treat low and intermediate-level radioactive waste generated by commercial nuclear power plants.

The process may be used to treat a variety of different radioactive wastes. Examples of suitable wastes include spent IER, spent GAC, and DAW, especially those produced by commercial nuclear power plants. Other examples of suitable wastes include various liquids such as chemical liquids that are incompatible with typical liquid waste processing systems, sludges, solid organic waste, and the like.

Spent IER is the ion exchange resin used to remove radionuclides from contaminated water in a nuclear power plant or other facility. The spent IER is loaded with radionuclides and must be disposed of as radioactive waste. Spent GAC is the granular activated carbon used to remove radionuclides from contaminated water in a nuclear power plant or other facility. It is also loaded with radionuclides and must be disposed of as radioactive waste.

DAW is the waste produced as a result of work performed in contaminated areas and on contaminated systems of a nuclear power plant or other facility. It is contaminated waste that is generated during the operation and maintenance of the facility. DAW includes things such as personal protection clothing, paper towels, rags, gloves, rubber boots, plastics bags, sheets, ventilation air filters, and the like.

The waste material may also be characterized based on its water content. The spent IER and spent GAC are generally considered wet solid wastes. A wet solid waste is any solid waste that contains sufficient free water to exceed limits for disposal under 10 CFR 61 without processing. A solid waste that is not a wet solid waste is one that does not satisfy these criteria. A wet waste refers to waste that contains sufficient water content to be pumped into collection tanks for further processing. Most wet solid wastes are generated from processing liquid waste.

As mentioned above, the process may be used to significantly reduce the volume of the waste material. The degree of volume reduction depends largely on the characteristics of the waste material. For example, a given volume of DAW may be reduced more than the same volume of IER because DAW contains a greater amount of organic material.

The process may be used to reduce the volume of DAW by at least approximately 5:1 or at least approximately 10:1. The process may also be used to reduce the volume of DAW by approximately 5:1 to approximately 40:1 or approximately 10:1 to approximately 50:1. The process may also be used to reduce the volume of DAW by no more than approximately 40:1 or no more than approximately 50:1.

The process may be used to reduce the volume of spent IER by at least approximately 3:1 or at least approximately 5:1. The process may also be used to reduce the volume of spent IER by approximately 3:1 to approximately 15:1 or approximately 5:1 to approximately 10:1. The process may also be used to reduce the volume of spent IER by no more than approximately 15:1 or no more than approximately 10:1.

Returning to FIG. 1, the feeding systems 30, 32 supply DAW and spent IER to the fluidized bed reactor system 24, respectively. The DAW feeding system 30 operates as follows. DAW is initially fed through a sorting stage 50 where items that are unsuitable for processing are removed. These items typically have a relatively high density so that during fluidization the particles gradually move downward in the fluidized bed reactor 34 and accumulate at the bottom.

The DAW may be sorted in any of a number of ways. For example, the DAW may be manually sorted using a glove box. The DAW is fed through the glove box and a worker removes items that are not suitable for processing. It is preferable for the sorting stage to be coarse and focus on removing large objects that may be easily separated. Small items and items that contain a combination of processable and unprocessable material that require significant effort to separate may be sent downstream for further processing by the shredder.

After being sorted, the DAW is then fed through a shredder 52 that reduces the size of the waste and homogenizes it into a narrower particle size distribution. The shredder 52 is capable of processing hard, rigid items such as metal components as well as some items that are considered unprocessable for the reasons explained above. In other words, the shredder 52 may be used to process almost any kind of waste material.

It should be appreciated that any suitable particle size reduction equipment may be used in place of the shredder 52. The only requirement is that the equipment should be capable of reducing the particle size and/or increasing the uniformity of the waste material. Examples of such equipment include crushers, pulverizers, grinders, mills, and the like. Also, as a general practice, it is often desirable to operate the shredder 52 or other particle size reduction equipment in an enclosed chamber with dust control.

The shredder 52 may be configured to reduce the DAW to any suitable particle size. In a preferred embodiment, the shredder 52 is configured to shred the DAW against a screen having openings ranging from approximately 0.5 inches (12.7 mm) to approximately 1 inch (25.4 mm). The range is selected based on the following factors: (1) reducing the waste material to particle sizes below 0.5 inches may result in significant dust generation, (2) particle sizes below 0.5 inches increase premature elutriation so that the particles do not have sufficient residence time in the fluidized bed reactor 34; (3) particle sizes greater than 1 inch do not fluidize well with the fluidized bed and may result in prolonged resident time and negatively impact the throughput and conversion.

The size reduced DAW particles are fed into the fluidized bed reactor 34 using a feeder 54 (alternatively a feeding device or feeding mechanism). It should be appreciated that the feeder 54 may be any suitable device or mechanism that is capable of transferring the DAW particles into the fluidized bed reactor 34. Examples of suitable feeders include screw or auger feeding mechanisms, hydraulic feeding mechanisms, and the like.

Figure 3:
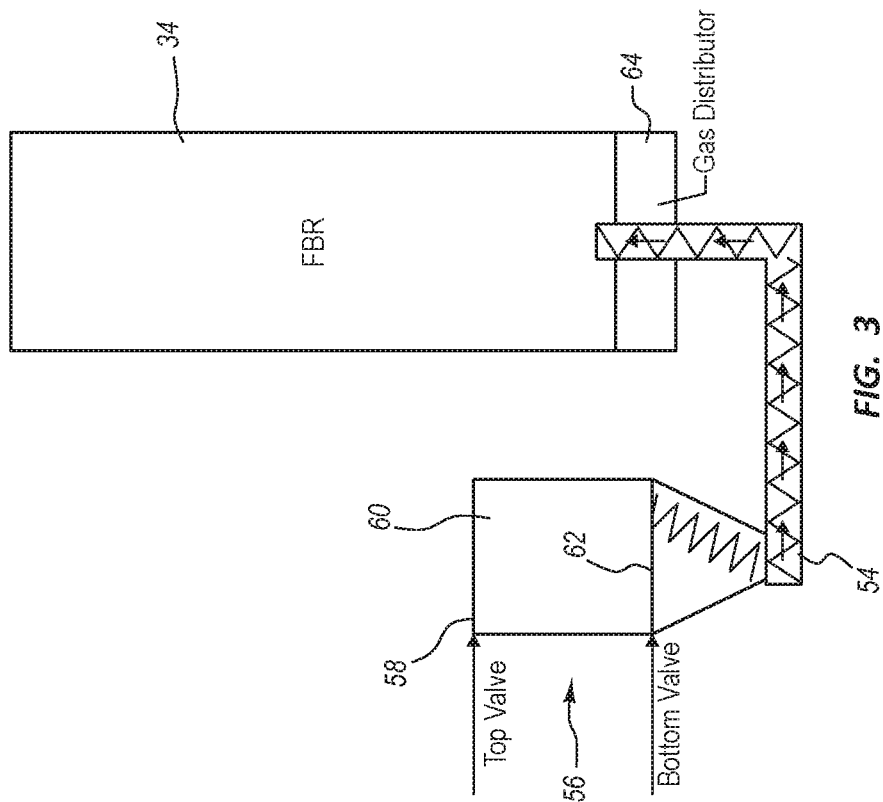
FIG. 3 is a process flow diagram of another embodiment of a DAW feeding system where the DAW is fed through the bottom of the fluidized bed reactor.
Figure 2:
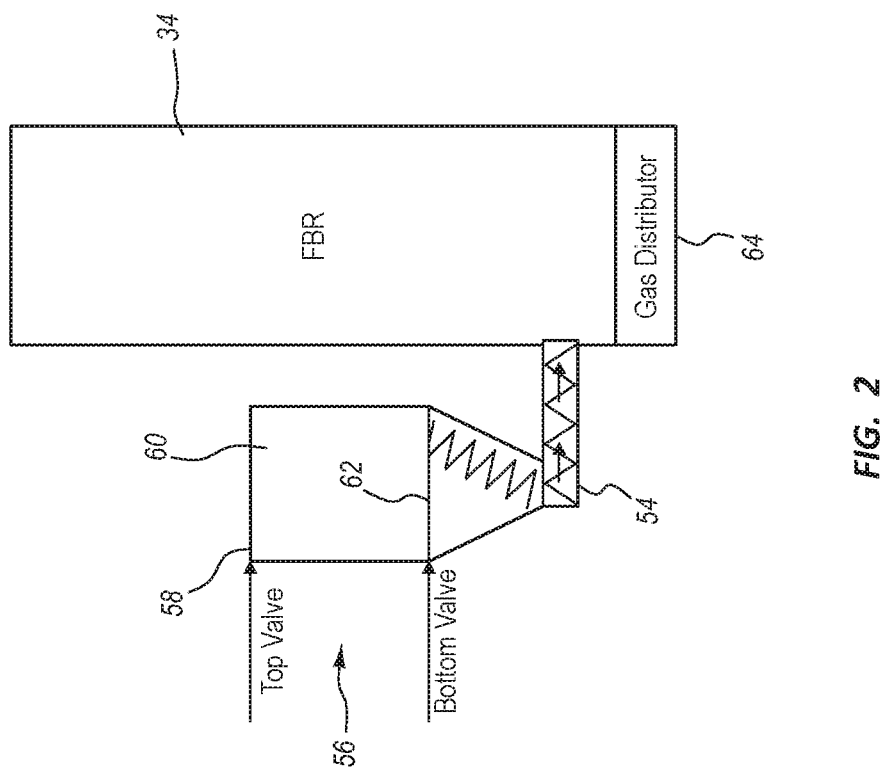
FIG. 2 is a process flow diagram of one embodiment of a DAW feeding system where the DAW is fed through the side of the fluidized bed reactor.

The DAW feed may enter the fluidized bed reactor 34 at any suitable location. For example, the DAW feed may enter through the side wall or through the bottom of the fluidized bed reactor 34. FIG. 2 shows an example of the DAW feed configured to enter through the side wall of the fluidized bed reactor 34, preferably a few inches above a fluidizing gas distributor 64. FIG. 3 shows an example of the DAW feed configured to enter through the bottom of the fluidized bed reactor 34 and opening just above the fluidizing gas distributor 64. In general, it is desirable for the DAW feed to enter the fluidized portion of the fluidized bed reactor 34.

Referring to FIGS. 2-3, the DAW may be fed into the fluidized bed reactor 34 using a vertical lock-hopper 56 comprising a top or first valve 58 positioned at the top of a chamber or pipe 60 and a bottom or second valve 62 positioned at the bottom of the chamber 60. The valves 58, 62 may be any suitable type of valve such as a ball valve, knife valve, gate valve, or the like.

The valves 58, 62 may be operated in the following sequence: (1) the top valve 58 opens and the DAW particles enter the chamber 60, (2) the top valve 58 closes, (3) the chamber 60 is pressurized with gas (e.g., nitrogen gas) until the pressure in the chamber 60 is the same as the pressure in the feeder 54 and the fluidized bed reactor 34, (4) the bottom valve 62 opens and the DAW particles drop and/or pushed to the horizontal feeder 54 until the entire batch is below the bottom valve 62, (5) the bottom valve 62 closes and the chamber 60 is depressurized to the pressure level of the upstream unit operation, and (6) the DAW particles are fed into the fluidized bed reactor 34 using a gas-tight, high-torque screw feeder (e.g., extruder without the extrusion die).

As mentioned above, the feeder 54 may be any suitable type of feeder. However, a high torque screw feeder such as an extruder without a die may be advantageous because it may feed the DAW particles into the fluidized bed reactor 34 even when the particles have melted, agglomerated, or otherwise undergone physical changes due to the high heat of the reactor 34. The extruder screw may extend through the wall of the fluidized bed reactor 34 and the tip may be flush with the inside surface of the wall. The extruder may also be equipped with a cooling jacket such as the associated with the feed adapter device described below.

The spent IER feeding system 32 is used to receive, hold, and feed the spent IER into the fluidized bed reactor 34. It should be appreciated that the IER feeding system 32 may have any suitable configuration and use any of a number of suitable devices as long as it is capable of feeding the spent IER into the fluidized bed reactor 34. It should be appreciated that although the following discussion focuses on feeding spent IER, it is equally applicable to spent GAC. The spent GAC may be fed together with the spent IER, separately from the spent IER using a separate feeding system having any one or combination of features disclosed in connection with the systems 32, 73, or some other system.

Figure 4:
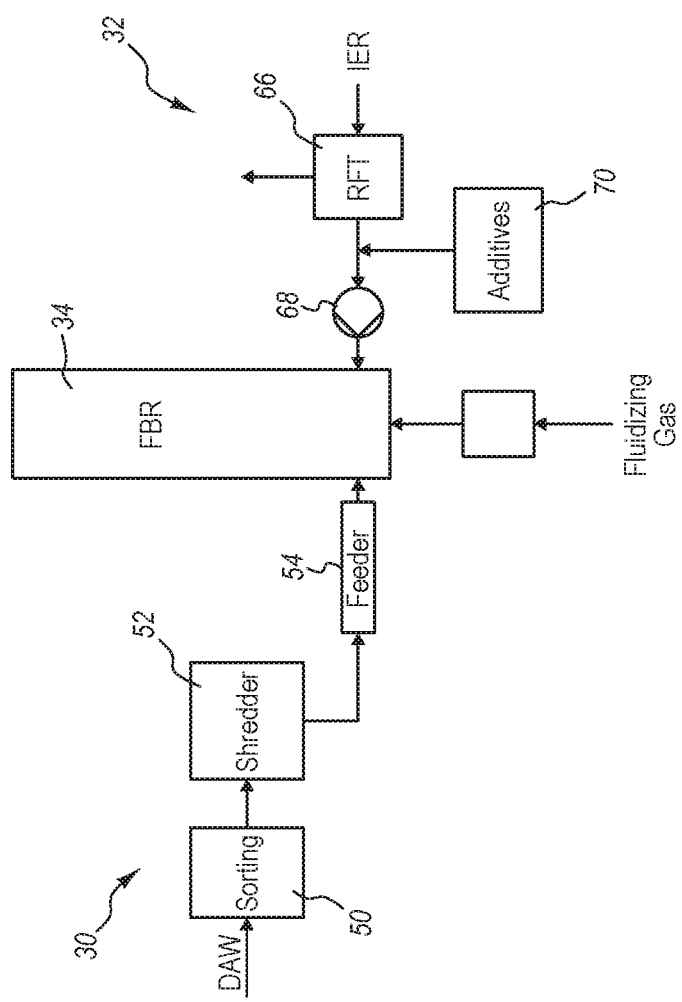
FIG. 4 is a process flow diagram of one embodiment of a spent IER feeding system where the spent IER is fed in a slurry to the fluidized bed reactor.

The spent IER feeding system 32 shown in FIG. 1 is a slurry based system configured to feed the spent IER into the fluidized bed reactor 34 as a slurry. FIG. 4 shows the same embodiment of the spent IER feeding system 32 in greater detail. The spent IER is initially delivered batchwise or continuously to a holding tank 66. The spent IER is continuously fed into the fluidized bed reactor 34 at a constant flow rate using a pump 68 (e.g., peristaltic pump, progressive cavity pump, or the like).

Water is used to suspend and/or transport the spent IER bead/powder into the fluidized bed reactor 34. Typically, the water content of the sluicing IER slurry is 75-90 wt % by weight. The spent IER is sluiced in at the designed processing rate. The maximum flow rate is restricted by the size of the fluidized bed reactor 34. The minimum flow rate is restricted by the characteristics of the spent IER. The flow has to be fast enough to keep the spent IER suspended in the solution so it does not settle out. Also, the transport line or pipe has to be certain size to prevent the spent IER from clogging the line. For example, for spent IER beads, the minimum rate is 0.25 gpm (2 ft$^3$/hr) with a 0.5 inch ID slurry transfer pipe.

One or more additives 70 may optionally be added to the spent IER feed stream to prevent agglomeration of the fluidized bed and/or stabilize the final waste product. The additives 70 may be added to the IER feed stream in any suitable manner. For example, the additives 70 may be fed into the IER feed stream in the form of a slurry or screw fed as a powder/particles into the IER feed slurry.

Fluidized bed agglomeration is a common problem when operating a fluidized bed reactor. Alkaline metal components, such as Li, Na, K, borate, and the like, may form low-melting point eutectics (e.g. alkali silicates) at the reaction temperature. The low-melting point eutectics become sticky under certain temperatures and bind with the bed particles as well as each other. The agglomeration of the bed particles may result in defluidization and an unscheduled shutdown of the fluidized bed reactor 34. Agglomeration may be even more problematic in a high radioactive environment because the cost to fix an agglomerated bed is much higher.

The spent IER and DAW often contain signifimayt amounts of Na and K compounds, which may pose a high risk of bed agglomeration. An anti-agglomeration additive or agent (AA) may be added to the waste feed to prevent the bed material from agglomerating. The AA material or the active ingredient in the AA material should react with the problematic components (such as alkaline metals) to form high-melting point eutectics and the reaction should be more competitive than the low-melting point eutectic formation reaction.

Examples of suitable AA materials include aluminum and iron compounds that are capable of binding with the problematic components to form high-melting point eutectics. The molar ratio of the aluminum and/or iron compounds to the alkaline metal of the feed may range from approximately 0.2 to approximately 1.5. For example, the dose of the aluminum and/or iron compounds may follow the following recipe: 1.5 mol aluminum and/or iron compounds per mole of B, 1 mole aluminum and/or iron compounds per mole of Na, 1 mole of aluminum and/or iron compounds per mole of K, 1 mole aluminum and/or iron compounds per mole of 1 mole Li. For example, a slurry comprising 40 wt % MICRAL 632 (alumnia trihydrate) or iron oxide ($Fe_2O_3$) and 60 wt % water may be added to the IER feed slurry.

The amount of AA material to use may be determined by analyzing the waste material for problematic components such as alkali metals and boron. The amount of AA material required may be reduced by the amount of AA material that is already present in the waste material. The spent IER from boiling water reactors often has significant amounts of $Fe_2O_3$, which readily serves as AA. In addition to preventing agglomeration of the fluidized bed, aluminum and/or iron compounds may also form spinels that serve to stabilize the final waste product. The preferred form of the final waste product is a waterless stable product with high leach resistance.

Figure 5:
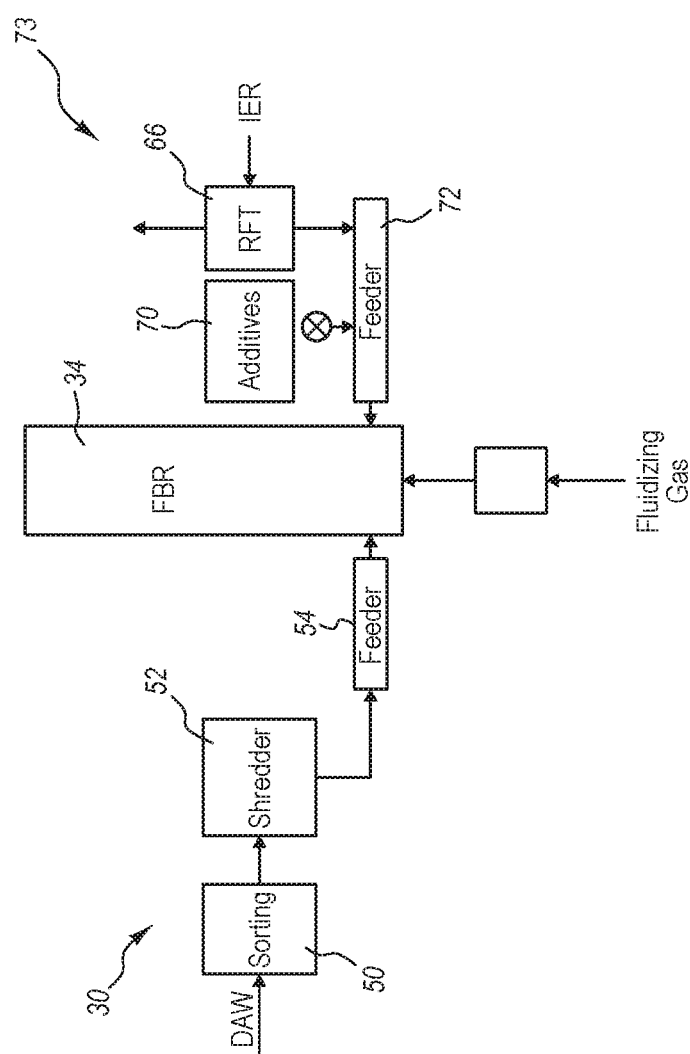
FIG. 5 is a process flow diagram of another embodiment of a spent IER feeding system where the spent IER is fed as dewatered solids to the fluidized bed reactor.

The spent IER may also be fed into the fluidized bed reactor 34 using the IER feeding system 73 shown in FIG. 5. Although the feeding systems 32, 73 share some similarities, the principal difference is that the spent IER feeding system 73 does not feed the spent IER into the fluidized bed reactor 34 in a slurry. Instead, the spent IER is dewatered and mechanically fed into the fluidized bed reactor 34.

The term "dewatered" generally refers to the removal of free water from the spent IER. Thus, dewatered spent IER is spent IER that has had all or substantially all of the free water removed. The water content of dewatered spent IER is typically approximately 45 to approximately 55 wt % compared to approximately 75 wt % to approximately 90 wt % for the spent IER slurry. In some embodiments, the dewatered spent IER has a water content of no more than 70 wt % or no more than 60 wt %.

The dewatered spent IER may be fed into the fluidized bed reactor 34 in a number of ways. For example, the spent IER may be batch transported to the holding tank 66 where the IER is dewatered. The dewatered spent IER is mixed with any additives 70 and then fed into the fluidized bed reactor 34 by a feeder 72. The additives 70 may be added to the dewatered spent IER as a powder or particulates. The feeder 72 may be any suitable type of feeding mechanism including any of those disclosed in connection with the feeder 54. For example, the feeder 72 may be a high torque screw feeder such as an extruder without a die on the end.

In another example, the spent IER may be batch or continuously transported to a first tank and then sluiced to a second tank where it is dewatered. The dewatered spent IER is then fed into the holding tank 66. The process of feeding the dewatered spent IER into the fluidized bed reactor 34 is the same as that described above.

Feeding dewatered spent IER into the fluidized bed reactor 34 provides a number of advantages. One is that it is more energy efficient because it is not necessary to gasify the free water in the spent IER slurry. Another is that the spent IER is no longer subject to a minimum feeding rate limitation like a slurry. This makes it possible to continuously feed small amounts of the spent IER together with other waste material such as DAW into the fluidized bed reactor 34. Eliminating the minimum feeding rate requirement for the spent IER provides flexibility to optimize the feed rate of the different waste materials to minimize energy consumption and provide the desired radioactivity in the final waste product.

With regard to energy consumption, when processing the spent IER (whether dewatered or in a slurry), it is often necessary to add a combustible material such as charcoal, coal, or the like, to the reactor 34 to provide energy for steam reforming. Adding the combustible material has a number of drawbacks. One is that it increases the cost of the process. Another is that it introduces impurities inherent in these materials which end up in the final waste product and negatively impact the overall volume reduction.

The need for a combustible material may be reduced or eliminated by co-processing the spent IER with another waste material that has a large amount of organic matter such as DAW. DAW has comparable heating values to commonly used combustible materials such as charcoal and the DAW itself needs to go through the process regardless. Co-processing the spent IER and DAW minimizes the amount of the final waste product compared to processing them separately. Moreover, the final waste product or reformed residue produced by processing DAW typically is less radioactive than that produced by processing spent IER. Co-processing the spent IER and DAW provides the benefit of homogenizing the radioactivity level of the final waste package.

The typical volume ratio of the spent IER to the DAW in commercial nuclear power plants is 1:6 to 1:15. If the waste is processed on-site in a waste treatment facility or processed off-site at a waste treatment facility that processes the full range of nuclear power plant waste and the spent IER is fed into the fluidized bed reactor 34 in a slurry, then the spent IER must be processed on a campaign basis in order to meet minimum flow requirements while the majority of the operation time is spent processing DAW alone.

However, if the spent IER is not fed into the fluidized bed reactor 34 in a slurry, then it may be co-fed into the fluidized bed reactor 34 at a reduced rate together with the DAW, which provides the energy required to maintain the reaction temperature. In effect, the DAW is used as a replacement for the combustible material in the fluidized bed reactor 34. It should be appreciated that it is possible to still process in the spent IER on a campaign basis Co-processing the spent IER and DAW provides a number of advantages including: (1) eliminating most of the nuclear facility's wastes in one process; (2) avoiding the use or reducing the quantity of combustible materials such as charcoal making it self-sustainable from an energy perspective, reducing cost, and preventing the negative impact on the volume reduction due to the inclusion of undesired impurities, and (3) manipulating the radioactivity of the final waste produce by adjusting the feeding ratio of the spent IER and DAW.

Referring to FIG. 1, the fluidized bed reactor 34 is the main unit operation for achieving the gasification of the organics and the volume reduction. In general, the fluidized bed reactor 34 is used to decompose and steam reform the waste material with the organic portion being primarily gasified into syngas. The bed media is primarily fluidized with superheated steam. A small amount of oxygen may also be fed into the fluidized bed reactor 34 to facilitate an oxidation reaction that provides the heat required for pyrolysis and steam reforming of the waste material. Any unprocessable DAW particles may be periodically augured out of the bottom of the fluidized bed reactor 34.

The fluidizing gas flows upwards through a distributor 64 located at the bottom of the fluidized bed reactor 34. The gas flow is greater than the minimum fluidization velocity, which is the flow velocity where the drag forces on the bed particles are equal to the weight of the particles and gives the bed a fluid-like behavior. The fluid-like environment provides intense mixing and solid/gas contact. This significantly improves heat and mass transfer between the materials so that the reaction occurs evenly with an excellent temperature distribution.

The fluidized bed reactor 34 contains a bed of media that is fluidized by the fluidizing gas. The bed media is preferably inert (does not react chemically), abrasion resistant, and crush resistant. The bed media may have any suitable shape although spherical particles are preferred. The bed media may also have any suitable size. In some embodiments, the bed media is approximately 200 microns to approximately 2000 microns in diameter or, preferably, approximately 400 microns to approximately 1000 microns in diameter.

The bed media may be made of any suitable material. For example, the bed media may be made of sintered clay, bauxite proppant, and the like. It is generally not recommended to use silica as the bed media due to its inclination to agglomerate through interaction with the reformed residue.

The fluidized bed reactor 34 may include an auger positioned at the bottom. The auger may be operated periodically to remove heavy particles that settle in the bottom of the fluidized bed reactor 34. The removed particles are combined with the other solids removed from the system 20 in the final waste product or reformed residue.

The fluidized bed reactor 34 may be operated at any suitable temperature. In general, the fluidized bed provides good temperature control. The fluidized bed area is where the waste material reacts and the temperature is the highest. The reaction temperature (or the temperature in the fluidized bed area) may be controlled to be approximately 650° C. to approximately 850° C. or, preferable, approximately 700° C. to approximately 750° C. Higher temperatures accelerate the reactions but the following factors generally set an upper limit on the reaction temperature: (1) increasing volatilization of Cs and Tc at higher temperatures, (2) calcination and carbonation of Ca compounds in the DAW under certain partial pressure of $CO_2$, and (3) agglomeration and deposition in the downstream equipment may be problematic due to large temperature variations between the fluidized bed reactor 34 and downstream separation equipment.

In some situations, it may be desirable to process very low level radioactive waste (VLLW; less than 100 kBq/kg) such as VLLW DAW at higher temperatures than would be suitable for other forms radioactive waste having a greater concentration of radionuclides such as spent IER. The higher temperatures help prevent the organic material from condensing and/or depositing on the process equipment as a sticky residue before reaching the thermal oxidizer. In these situations, the fluidized bed reactor 34 can be operated at a temperature of approximately 600° C. to approximately 1100° C., approximately 850° C. to approximately 1100° C., approximately 900° C. to approximately 1100° C., or approximately 950° C. to approximately 1100° C.

It should be noted that it is generally undesirable to process spent IER and other higher level wastes at these temperatures because it will volatilize the radionuclides. However, the higher temperatures are advantageous when processing VLLW such as VLLW DAW because it has a relatively low radionuclide content and the benefits of the higher temperatures outweigh the drawback of volatilizing the radionuclides. The few radionuclides in the VLLW waste are capture in the downstream gas filtration processes so that they are not released into the environment.

In order to run at these higher temperatures, the process and/or system components, especially those between the fluidized bed reactor 34 and the thermal oxidizer 40, may be fabricated using high-temperature alloys such as Haynes 556, Inconel 617, Haynes 230, and the like and/or include refractory heat shields. Also, the use of refractory heat shields may make it possible to fabricate the process equipment from less exotic and/or less expensive materials and include a heat trace made of, for example, nichrome alloy.

The fluidized bed reactor 34 may be operated at any suitable pressure. For example, the reactor 34 may be operated at atmospheric pressure at the freeboard or, preferably, a slightly negative pressure at the freeboard. Operating at a slightly negative pressure reduces the risk of gases and/or radioactive particles leaking out of the system 20. This helps maintain the containment of the radioactivity. In some embodiments, the fluidized bed reactor 34 may be operated at a pressure (at the freeboard) of approximately −50 inches of water (approximately −12.5 kPa) to approximately −25 inches water (approximately −6 kPa) or approximately −35 inches of water (approximately −8.7 kPa).

The fluidizing gas enters the fluidized bed reactor 34 through the gas distributor 64. The fluidizing gas may be steam that is superheated to approximately 450° C. to approximately 600° C. In some embodiments, the steam is the primary fluidizing gas and reactive gas. The waste particles primarily undergo decomposition according to equation 1, steam reforming according to equation 2, and oxidation according to equations 3-6. The organic portion of the waste material and the water (in the spent IER) are gasified, which greatly reduces the volume of the final solid waste product or reformed residue compared to the original waste.

The synthetic gas produced in the fluidized bed reactor 34 is generated from the reaction, including CO, $H_2$, $H_2O$, steam, $CO_2$ and hydrocarbons.

$$C_xH_yO_z \rightarrow C + CH_4 + CO + H_2 + C_mH_nO_l \quad \text{(equation 1)}$$

The fluidized gas steam reacts with the carbon, either from the organic decomposition or from the addition of combustible material (for processing spent IER in certain situations), generating hydrogen and carbon monoxide gas.

$$C + H_2O \rightarrow H_2 + CO \quad \text{(equation 2)}$$

Carbon, carbon monoxide and hydrogen gas may be oxidized as follows.

$$C + O_2 \rightarrow CO_2 \quad \text{(equation 3)}$$

$$2CO + O_2 \rightarrow 2CO_2 \quad \text{(equation 4)}$$

$$H_2 + O_2 \rightarrow 2H_2O \quad \text{(equation 5)}$$

Carbon monoxide and steam may undergo a water gas shift reaction, converting to carbon oxide and hydrogen.

$$CO + H_2O \rightarrow CO_2 + H_2 \quad \text{(equation 6)}$$

The fluidized bed reactor 34 should be maintained under reducing conditions even though energy for maintaining the reaction temperature is supplied by oxidizing carbonaceous material. This may be done by controlling the oxygen fugacity in the fluidized bed reactor 34.

The oxygen fugacity may be adjusted by controlling the amount of oxygen fed into the fluidized bed reactor 34. Oxygen may be added to change the redox conditions in the fluidized bed reactor 34 from "strongly reducing" (no oxygen) to "normal reducing" and even to "relatively oxidizing," if necessary. In general, it is desirable to keep the reaction condition on the reduction side to prevent undesirable formation of dioxins/furans, maintain the desired steam reforming reaction temperature, prevent volatilization of some radionuclides, and/or minimize $NO_x$ formation.

It is generally desirable to provide the minimum amount of oxygen required to maintain the reaction temperature inside fluidized bed reactor 34 including supplying the heat needed for endothermic reactions in the system 24 such as those represented by equations 1 and 2. In some embodiments, the oxygen fed into the reactor does not exceed 20 vol % of the total volume of the gas input into the fluidized bed reactor 34. In other embodiments, the equivalence ratio is no more than 0.5 and no residual oxygen leaves the fluidized bed reactor 34. The equivalence ratio is the ratio of supplied oxygen to that required for complete stoichiometric combustion.

In FIG. 1, the fluidized bed reactor 34 is in a one-pass configuration. The waste material goes into the fluidized bed reactor 34, the organic material is gasified, and the entrained particles including the carbonaceous solid particles, inorganic solids, and/or bed fines exit in the gas stream. The cyclone 36 and the high-temperature filter 38 separate the entrained particles for disposal and/or long-term storage.

In the one-pass configuration, the fluidized bed reactor 34 has two sections: (1) the fluidized bed zone located in the lower section of the reactor 34 and (2) the disengaging freeboard zone located in the upper section of the reactor 34. The freeboard zone has a larger diameter compared to the fluidized bed zone. The increased diameter of the freeboard zone causes the superficial space velocity to decrease. This causes the majority of the entrained particles to fall back to the fluidized bed area.

It should be appreciated that the fluidized bed reactor 34 may have any suitable superficial space velocity as measured in the fluidized bed section. In general, the superficial space velocity should produce good fluidization and yet minimize elutriation of the bed material. In some embodiments, the superficial space velocity may be approximately 1.1 ft/s to approximately 2.5 ft/s (approximately 33.5 cm/s to approximately 76 cm/s), approximately 1.2 ft/s to approximately 2.0 ft/s (approximately 36.5 cm/s to approximately 61 cm/s), approximately 1.3 ft/s to approximately 1.7 ft/s (approximately 39.5 cm/s to approximately 52 cm/s), or approximately 1.4 ft/s to approximately 1.6 ft/s (approximately 42.5 cm/s to approximately 49 cm/s).

Figure 6:
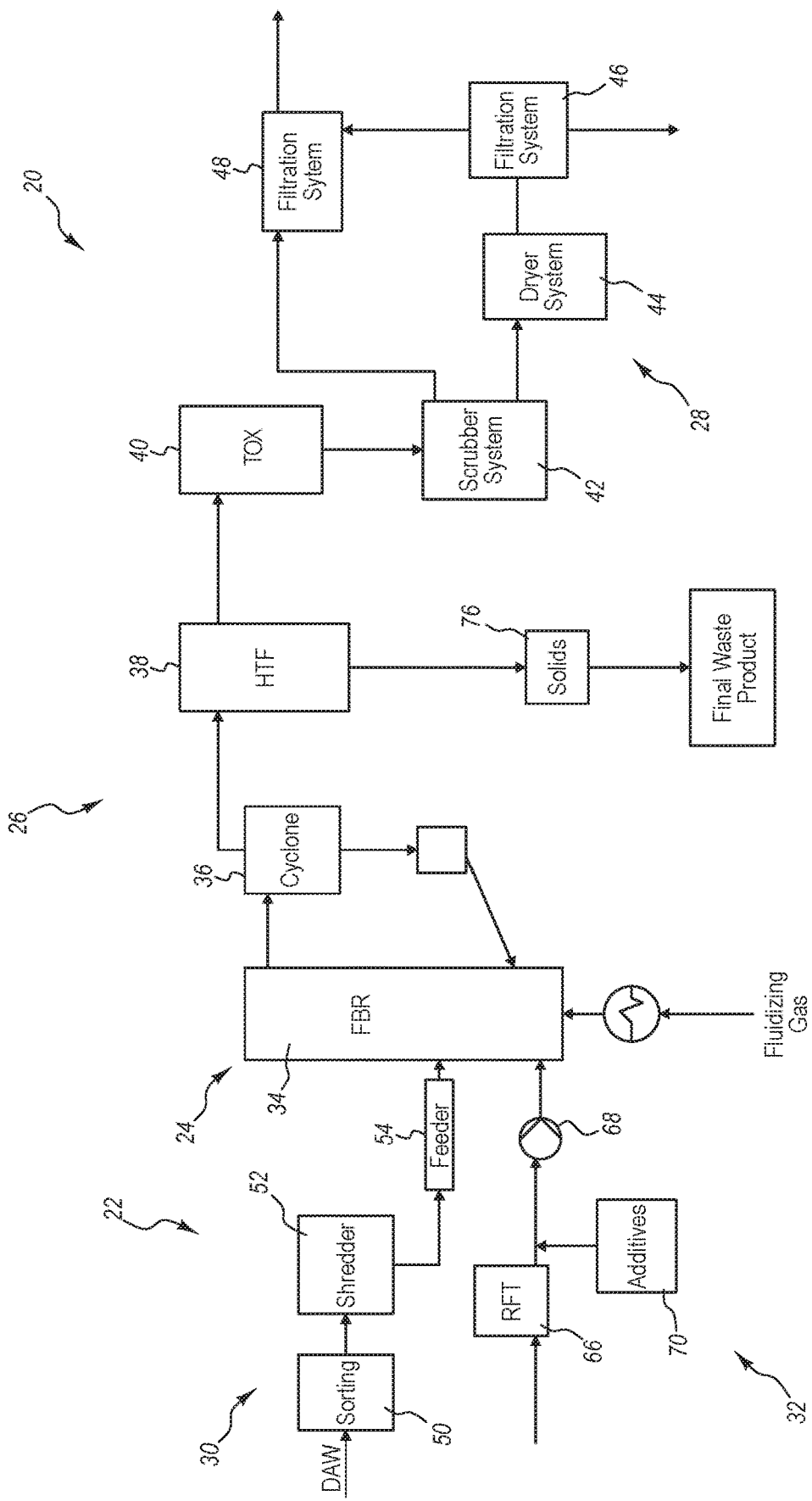
FIG. 6 is a process flow diagram of another embodiment of a process for steam reforming waste contaminated with radionuclides where the fluidized bed reactor is in a recirculating configuration.

The fluidized bed reactor 34 may be operated in a recirculating bed configuration instead of the one-pass bed configuration. One example of a recirculating bed configuration is shown in FIG. 6. In the recirculating bed configuration, the entrained particles are separated by the cyclone 36 and returned to the fluidized bed reactor 34. The particles recirculate in this manner until they become too fine or too light to be separated by the cyclone 36. This configuration improves the volume reduction of the waste material by reacting solid carbonaceous particles that would otherwise end up in the final waste product.

In this one-pass configuration, the fluidizing gas entrains light fine waste particles, reformed residues including the inorganics and char (unreacted carbon), and some bed media that has been fluidized for a long period of time and has been worn to an elutriable size and/or weight. All or almost all of the particles in the gas stream are collected in the reformed residue. In the one-pass configuration, the reformed residue includes 5 wt % to 20 wt % of residue carbonaceous material.

In the recirculating configuration, the unreacted carbon and/or carbonaceous intermediates are processed multiple times to achieve better conversion and, consequently, greater volume reduction. The recirculation mode also allows for higher gas velocities and faster fluidization, which further improves the mixing and/r heat and mass transfer and reduces the risk of agglomeration. In the recirculating configuration, the reformed residue includes no more than 5 wt % or no more than 4 wt % of residue carbonaceous materials.

It should be appreciated that the configuration of the fluidized bed reactor 34 may be changed in a number of ways. For example, in the recirculating configuration, more than one cyclone 36 may be used to separate the waste particles and circulate them to the fluidized bed reactor 34. The cyclones 36 may be positioned in series and/or parallel. In one embodiment, two cyclones 36 positioned in series may be used to separate the waste particles from the gas stream and circulate them to the fluidized bed reactor 34.

The fluidized bed reactor 34 may be operated as a fully circulating bed or a partially circulating bed. The difference is that in a fully recirculating bed, all of the particles flow through the fluidized bed reactor 34 to the cyclone 36 and in a partially recirculating bed, only some of the particles flow through the fluidized bed reactor 34 to the cyclone 36. The fluidized bed reactor 34 in a fully recirculating bed configuration generally does not include an expanded freeboard zone. Instead, the fluidized bed reactor 34 has the same or roughly the same diameter along its entire length. In contrast, the fluidized bed reactor 34 in a partially recirculating bed generally does include an expanded freeboard zone.

Figure 7:
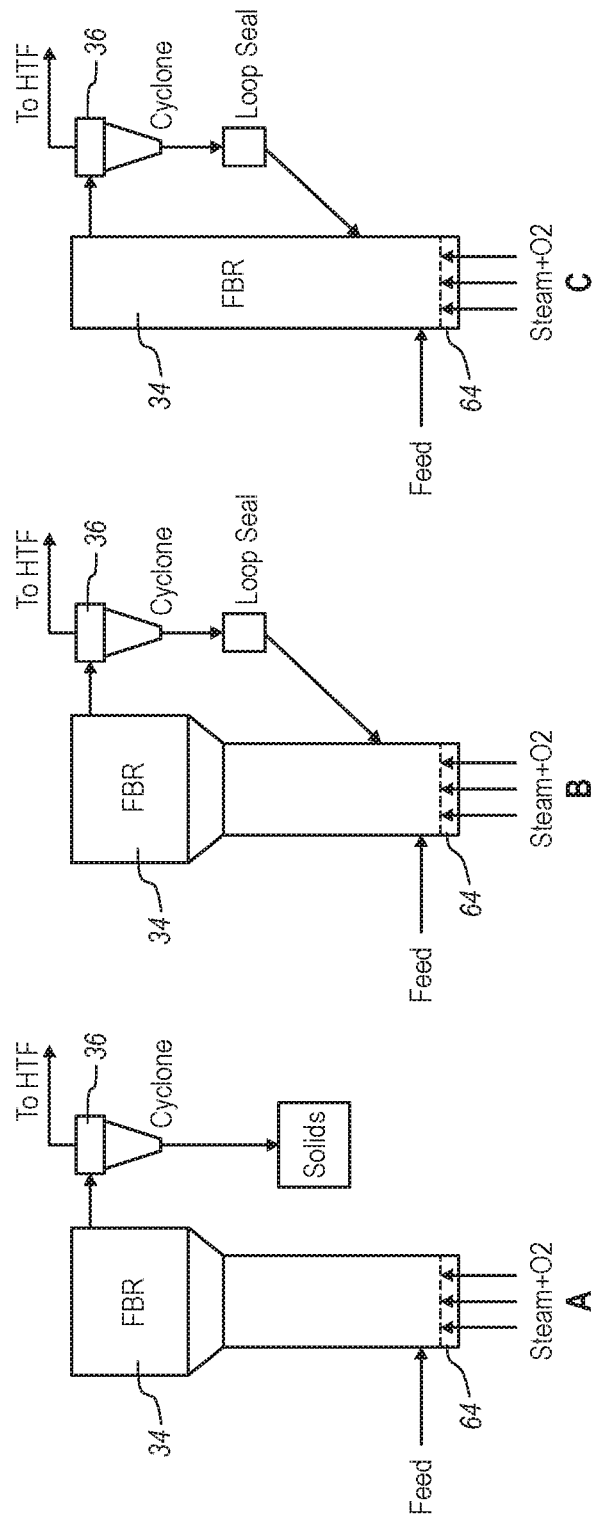
FIG. 7 shows an embodiment of the fluidized bed reactor where oxygen is fed upward through the bottom of the reactor with the fluidizing gas. The fluidizing bed reactor is shown in a one-pass configuration (A), a partially recirculating configuration (B), and a fully recirculating configuration (C).

The fluidized bed reactor 34 is shown in FIG. 7 in a one-pass configuration A, a partially recirculating configuration B, and a fully recirculating configuration C (uniform diameter; no freeboard zone). In the fully recirculating configuration, the waste enters the fluidized bed reactor 34 and is gasified. The entrained particles, including carbonaceous solid intermedia, inorganic solids, and bed materials are separated from the gas stream by the cyclone 36 and circulated back to fluidized bed reactor 34. The solids keep making a round trip through the fluidized bed reactor 34 until they become too fine to be captured by the cyclone 36.

It should be appreciated that the fluidizing gas in the recirculating configurations may have any suitable superficial space velocity. In general, the superficial space velocity of the fluidizing gas may be higher in the fully recirculating configuration than the partially recirculating configuration. For example, in the fully recirculating configuration, the superficial space velocity of the fluidizing gas measured in the fluidized bed section may be approximately 4 ft/s (approximately 122 cm/s) to approximately 6 ft/s (approximately 183 cm/s). In the partially recirculating configuration, the superficial space velocity of the fluidizing gas measured in the fluidized bed section may be approximately 2 ft/s (approximately 61 cm/s) to approximately 4 ft/s (approximately 122 cm/s).

Figure 8:
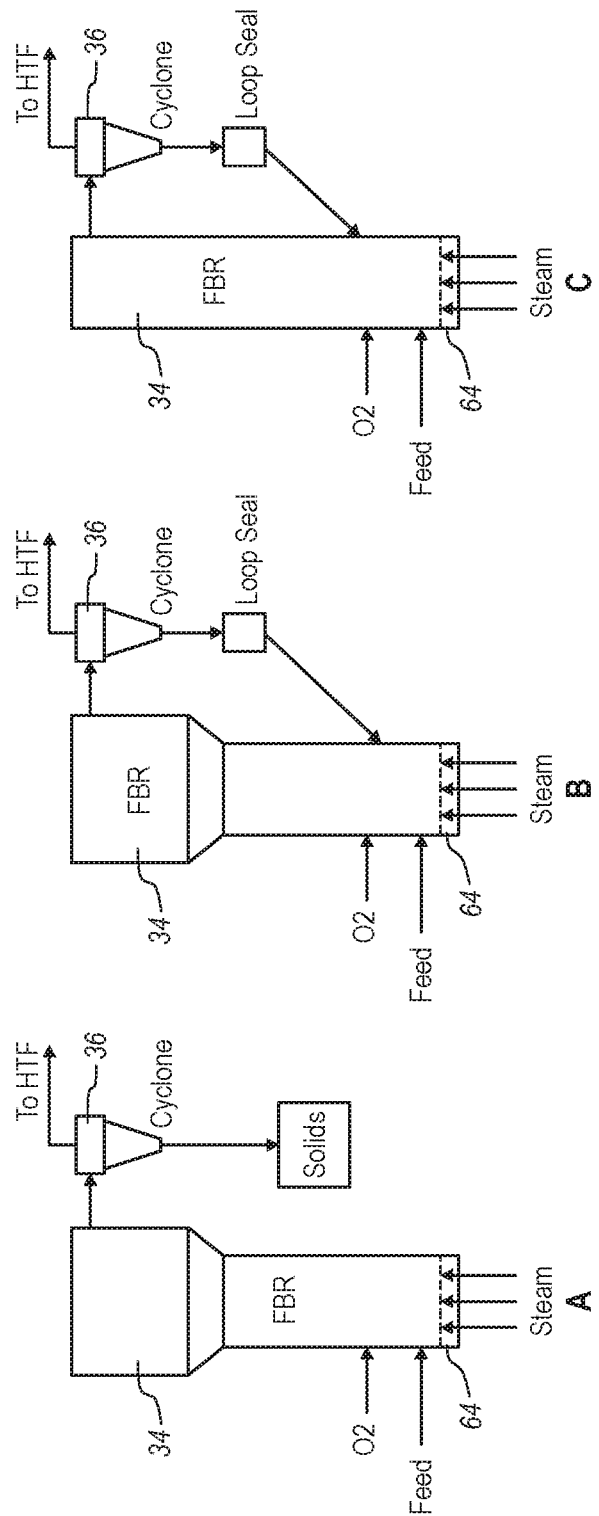
FIG. 8 shows another embodiment of the fluidized bed reactor where oxygen is fed through the side of the reactor just above the location where the waste feed enters. The fluidizing bed reactor is shown in a one-pass configuration (A), a partially recirculating configuration (B), and a fully recirculating configuration (C).
Figure 9:
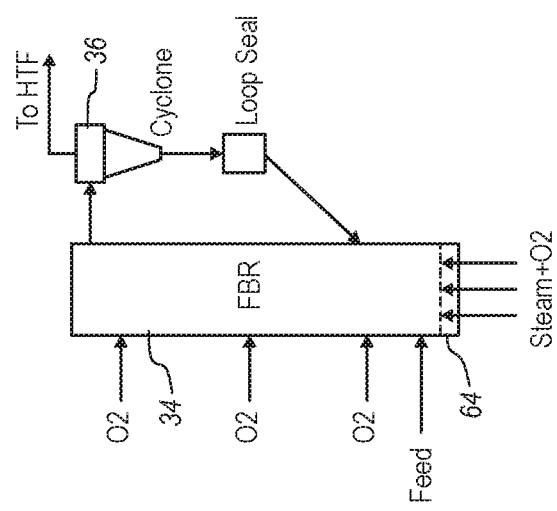
FIG. 9 shows another embodiment of the fluidized bed reactor where oxygen is fed upward through the bottom of the reactor and through the side of the reactor just above the location where the waste feed enters. The fluidizing bed reactor is shown in a fully recirculating configuration.

Returning to the subject of adding oxygen to the fluidized bed reactor 34, it should be appreciated that oxygen may be fed into the fluidized bed reactor 34 in any suitable manner. FIGS. 7-9 show various arrangements for feeding oxygen into the fluidized bed reactor 34. The oxygen may be used to provide energy for the pyrolysis and steam reforming reactions.

FIG. 7 shows one configuration where oxygen is fed into the fluidized bed reactor 34 with the fluidizing gas. Specifically, the oxygen flows upward through the gas distributor 64 with the superheated steam into the fluidized bed reactor 34. FIG. 7 shows the fluidized bed reactor 34 in a one-pass configuration A, a partially recirculating configuration B, and fully recirculating configuration C (the superficial space velocity increases from A to C).

FIG. 8 shows another configuration where oxygen is fed into the fluidized bed reactor 34 at a location slightly above the location where the waste material enters the side of the fluidized bed reactor 34. The oxygen may enter the fluidized bed reactor 34 at this height through a single opening or through multiple ports or openings distributed around the perimeter of the reactor 34. Adding oxygen just above the entrance of the waste feed may help prevent some of the higher-density feed particles from accumulating in the bottom of the fluidized bed. This configuration may also result in a higher oxygen concentration near the entrance of the waste feed that could produce hotspots in the area. FIG. 8 shows the fluidized bed reactor 34 in a one-pass configuration A, a partially recirculating configuration B, and fully recirculating configuration C.

In another configuration, oxygen may be fed into the fluidized bed reactor 34 with the fluidizing gas as shown in FIG. 7 and through the side of the reactor 34 as shown in FIG. 8. The flow rate at each location may be reduced to maintain the same total flow rate.

FIG. 9 shows another configuration where oxygen is fed into the fluidized bed reactor 34 at multiple levels. It also shows the oxygen being fed through the bottom of the fluidizing bed reactor 34 with the fluidizing gas. It should be appreciated, however, that other embodiments may include only feeding the oxygen gas through the side of the fluidized bed reactor 34 and not through the bottom. The configuration shown in FIG. 9 is especially applicable to the f fluidized bed reactor 34 when it is operating in a fully recirculating mode. Adding oxygen at multiple levels helps prevent a given area from becoming overly abundant in oxygen and thus changing the reducing conditions at that location of the fluidized bed.

Figure 10:
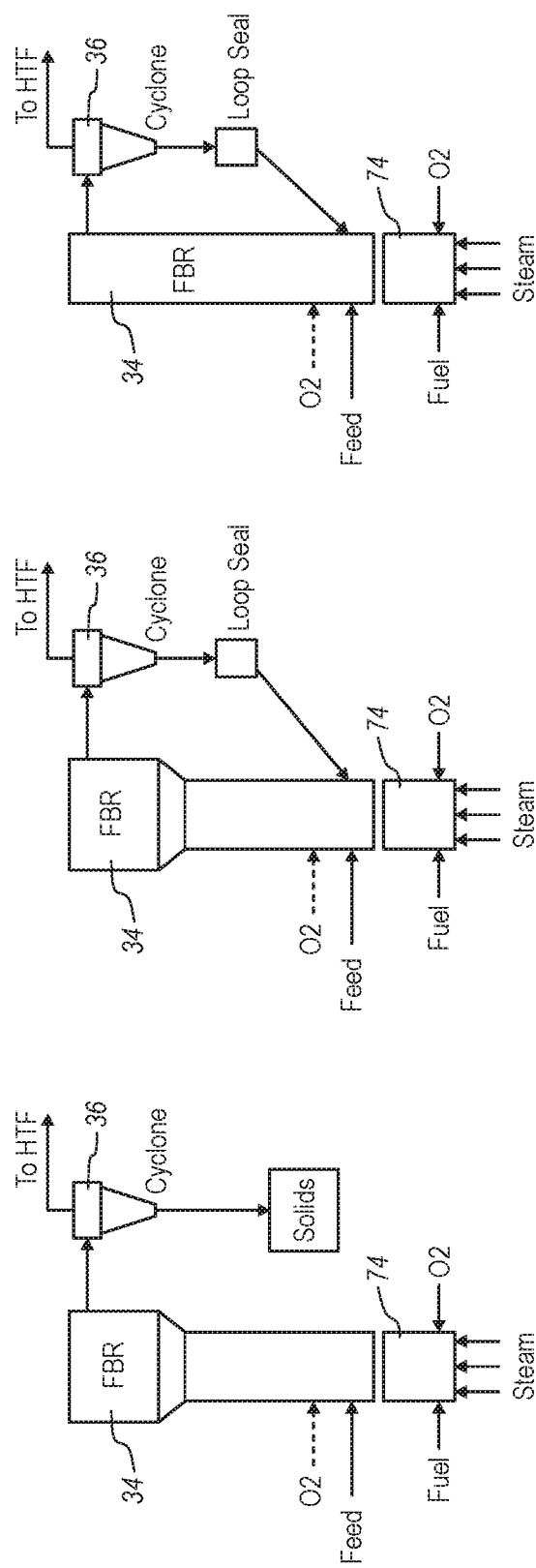
FIG. 10 shows another embodiment of the fluidized bed reactor where heat is provided to the fluidized bed reactor by a wind-box section.

FIG. 10 shows another arrangement for providing heat to the pyrolysis and steam reforming reactions in the fluidized bed reactor 34. In this arrangement, instead of supplying oxygen to the fluidized bed and using the heat generated from the oxidation of the feed and/or added combustible material, the energy is supplied by combusting fuel in a wind-box section 74 prior to entering the fluidized bed.

The fuel is combusted in the wind-box section 74 and the gas ($CO_2$ and steam) generated is hot and carries energy to the fluidized bed that may be used to support the pyrolysis and steam reforming reactions. Also, the reaction heat produced by combusting the fuel may be used to superheat the fluidizing gas steam.

One advantage of this arrangement is that the fluidized bed reactor 34, including the actual fluidized bed zone, may be maintained at a complete reducing condition. Another advantage is that a gaseous fuel may be used instead of a solid combustible fuel such as charcoal that produces solid impurities that collect in the final waste product. Another advantage is that it allows for higher fluidizing gas flow rates through the fluidized bed reactor 34. This is especially desirable when the fluidized bed reactor 34 is operated in the partially or fully recirculating mode. Oxygen may still be supplied in any of the ways described above to fine-tune the redox condition.

It should be appreciated that other methods may be used to heat the fluidized bed reactor 34. One such method is to heat the fluidized bed reactor 34 using electrical heating elements. The heating elements may be positioned inside the fluidized bed reactor 34 or, preferably, around the outside of the fluidized bed reactor 34. The heating elements will last longer outside of the highly abrasive environment in the fluidized bed reactor 34. Electrical heating may be especially suitable for smaller sized systems where the fluidized bed reactor has a diameter of no more than approximately 10 inches (approximately 25.4 centimeters). Oxygen may still be supplied in any of the ways described above to fine-tune the redox condition.

Referring to FIG. 1, the gases leave the fluidized bed reactor 34 together with some entrained solids and enter the solids separation system 26. In the embodiment shown in FIG. 1, the solids separation system 26 includes the cyclone 36 and the high-temperature filter 38. The cyclone 36 performs a coarse separation of the solids and takes most of the separation load. The remainder of the solids are removed by the high-temperature filter 38. The solids separation system 26 may achieve greater than 99.9% solids removal from the off-gas stream. The solids are captured in a solids collection vessel 76 and eventually disposed of as the final waste product.

The temperature of the equipment and piping from the fluidized bed reactor 34 to the thermal oxidizer 40 may be maintained at an elevated temperature that is sufficient to prevent condensation of the hydrocarbons in the gas stream before they may be consumed in the thermal oxidizer 40. In the embodiment shown in FIG. 1, this may be accomplished by maintaining the temperature of the gas at the outlet of the cyclone 36 above at least 600° C. and at the outlet of the high-temperature filter 38 above at least 500° C. or, preferably, above at least 550° C. The equipment and piping may also be well insulated and/or even heat traced to maintain the desired temperature.

Figure 11:
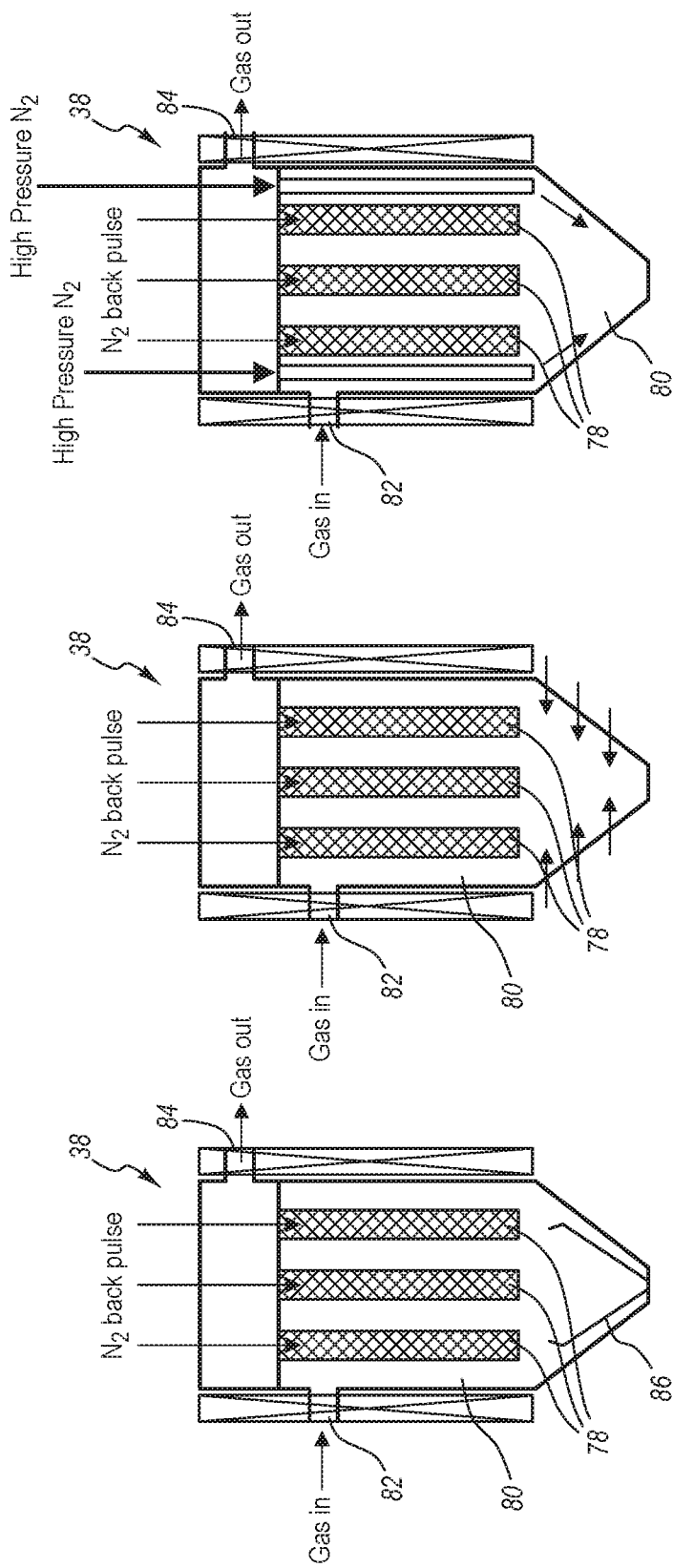
FIG. 11 shows three different embodiments of the high-temperature filter. Each embodiment uses a different method to prevent particle bridging in the bottom of the filter.

The high-temperature filter 38 is configured to separate entrained fines from the hot off-gas stream from the cyclone 36. FIG. 11 shows some examples of suitable configurations for the high-temperature filter 38. In general, the high-temperature filter 38 includes filter elements 78 that may withstand temperatures up to at least 600° C. or, preferably, up to at least 700° C. Examples of filter elements 78 that withstand these temperatures include those made of sintered metal and/or ceramics.

In the embodiment shown in FIG. 11, the filter elements 78 are configured to operate in an outside-in fashion meaning the gas flows into a chamber 80 in the high-temperature filter 38 through an entry opening 82, passes through an outside surface of the filter elements 78 where the solids are retained, travels through the inside of the filter elements 78, and exits through an exit opening 84.

The solids in the gas stream have a tendency to build up on the exterior surface of the filter elements 78. This may be removed by periodically back-pulsing the filter element 78. For example, the filter elements 78 may be back-pulsed when the pressure drop across the high temperature filter 38 exceeds a preset threshold.

The solids removed from the filter elements 78 fall off and accumulate in the bottom of the high-temperature filter 38. In some cases, the solids may form a bridge that blocks the discharge port in the bottom of the high-temperature filter 38. FIG. 11 show some embodiments of the high-temperature filter 30 that may prevent and/or break up particle bridging.

The embodiment on the left uses a mechanical device 86 such as rotational tongues, chains, or the like, to break up the bridged solids. The embodiment in the center uses a steady or pulsed flow of gas (e.g., nitrogen gas) from the sides to pneumatically break up the bridged solids. The embodiment on the right uses a pulsed flow of gas (e.g., nitrogen gas) from the top to pneumatically break up the bridged solids.

In those embodiments that use gas to break up the bridged solids, the gas should be heated to a temperature above at least 500° C. or, preferably, at least 650° C. Also, the temperature in and around the filter elements 78 should be maintained above at least 500° C. The embodiments in the center and on the right are preferred because they have no moving mechanical parts and are thus easier to maintain. It should be appreciated that numerous other methods may be used to prevent the formation of the bridged solids and/or break up the bridged solids.

Referring to FIG. 1 one, the gas stream leaves the solids separation system 26 and enters the off-gas treatment system 28. Specifically, the off-gas stream enters the thermal oxidizer 40 where the reducing gas components (such as $H_2$, CO, $CH_4$) are converted to $CO_2$ and $H_2O$ by a natural gas flame that heats the gas to approximately 1000° C. to approximately 1200° C. The off-gas stream may optionally be mixed with air before entering the thermal oxidizer 40.

The gas from the thermal oxidizer 40 then goes to the scrubber system 42 where it is quenched in a sodium hydroxide solution to a temperature below 80° C., preferably within seconds. Any gaseous acidic components such as HCL, SO2, and NOx are scrubbed and the steam is condensed. The pH of the scrubber bath may be maintained at approximately 6.5 to approximately 7.5 by constantly replenishing the sodium hydroxide solution. It is generally desirable to not let the pH of the solution drop much below 6.5 to prevent carbon dioxide from being scrubbed, which would significantly increase the volume of the secondary waste-salt.

The scrubber liquid from the scrubber system 42 is spray-dried in the dryer system 44 to remove the water. The dried solid particles are separated from the steam containing gas stream in the filtration system 46. The dried salt is collected from the filtration system 46 as a secondary product.

The off-gas from the scrubber system 42 is primarily composed of carbon dioxide and nitrogen gas, and possibly some residual oxygen gas. It and the off-gas stream from the filtration system 46 pass through a final filtration system 48 before being emitted into the atmosphere. In one embodiment, the filtration system 48 includes HEPA filters that remove any additional impurities in the gas streams.

Figure 12:
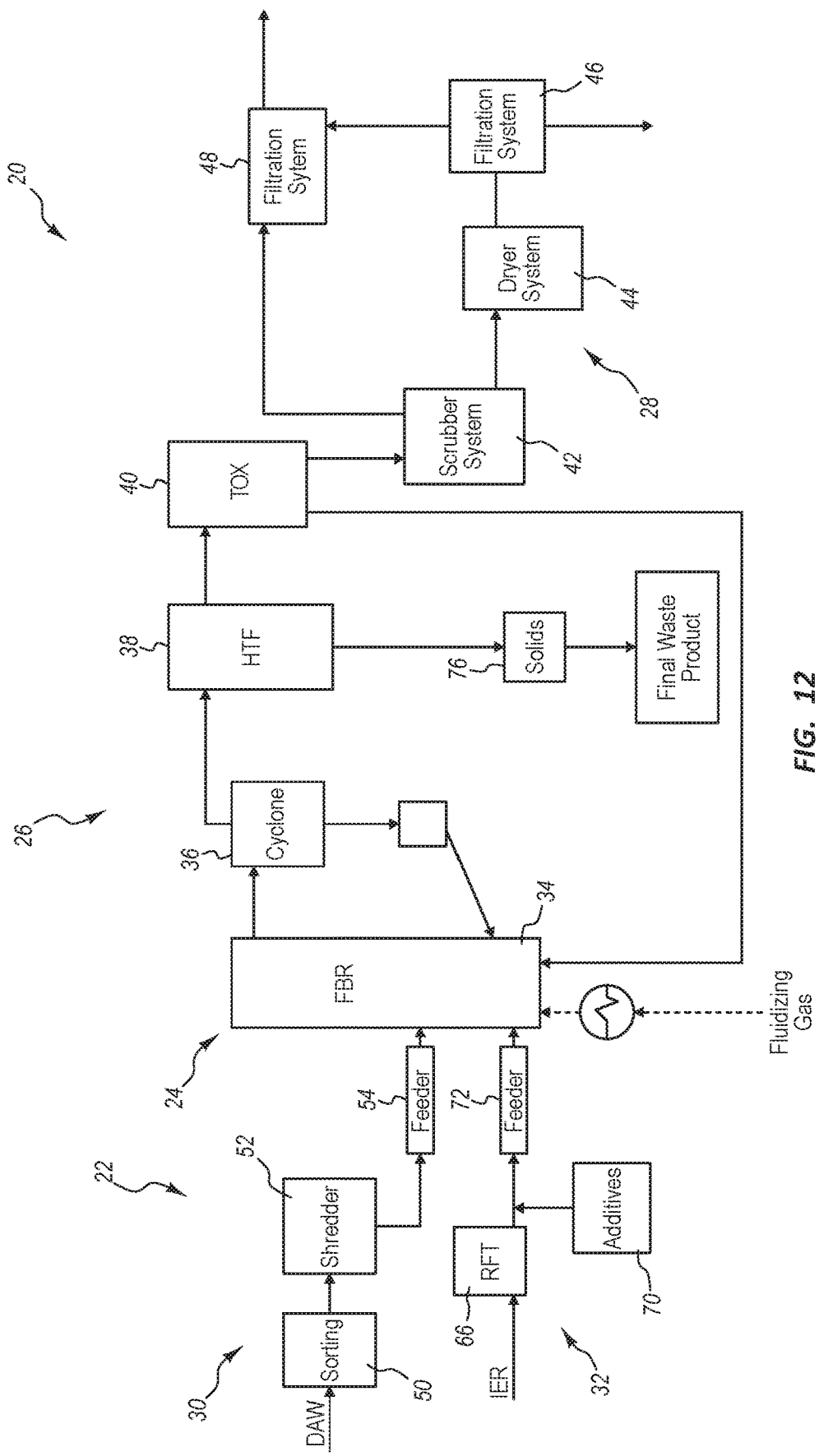
FIG. 12 shows another embodiment of the process for steam reforming waste contaminated with radionuclides where the off-gas from the thermal oxidizer is used as the fluidizing gas for the fluidized bed reactor.

FIG. 12 shows an alternative embodiment of the system 20 where a portion of the off-gas from the thermal oxidizer 40 is used as the fluidizing gas for the fluidized bed reactor 34. This embodiment may advantageously reduce energy consumption, water inventory, and overall emissions.

FIG. 12 shows the fluidized bed reactor 34 in a recirculating configuration (partial or fully recirculating). However, it should be appreciated that the off-gas from the thermal oxidizer 40 may also be recycled when the fluidized bed reactor 34 is in a one-pass configuration.

The off-gas stream from the thermal oxidizer 40 has a temperature of approximately 950° C. to approximately 1100° C. and the off-gas stream is composed primarily of steam and carbon dioxide. The design of the thermal oxidizer 40 is such that the pressure of the off-gas stream is approximately 15 psig (approximately 103 kPa) to approximately 50 psig (approximately 345 kPa), which is consistent with the pressure requirement for the fluidizing gas.

The off-gas stream is split to maintain the overall mass balance in the system 20. The bleed stream goes through the downstream process as disclosed above. The recycled off-gas stream includes a substantial amount of steam, which reduces, if not eliminates, the need for additional fresh steam.

This embodiment has several advantages: (1) significant reduction of energy consumption (minimal/no energy needed to generate/superheat the fluidizing gas; less energy required to quench the reduced volume off-gas); (2) less water consumption, and less discharge of water vapor from the facility; (3) potentially significant size reduction of the downstream equipment and steam generator. There is no tritium or minimal level of tritium in the DAW and spent IER, which makes it possible to have water (steam) recycling in the system without increasing the tritium level.

Figure 13:
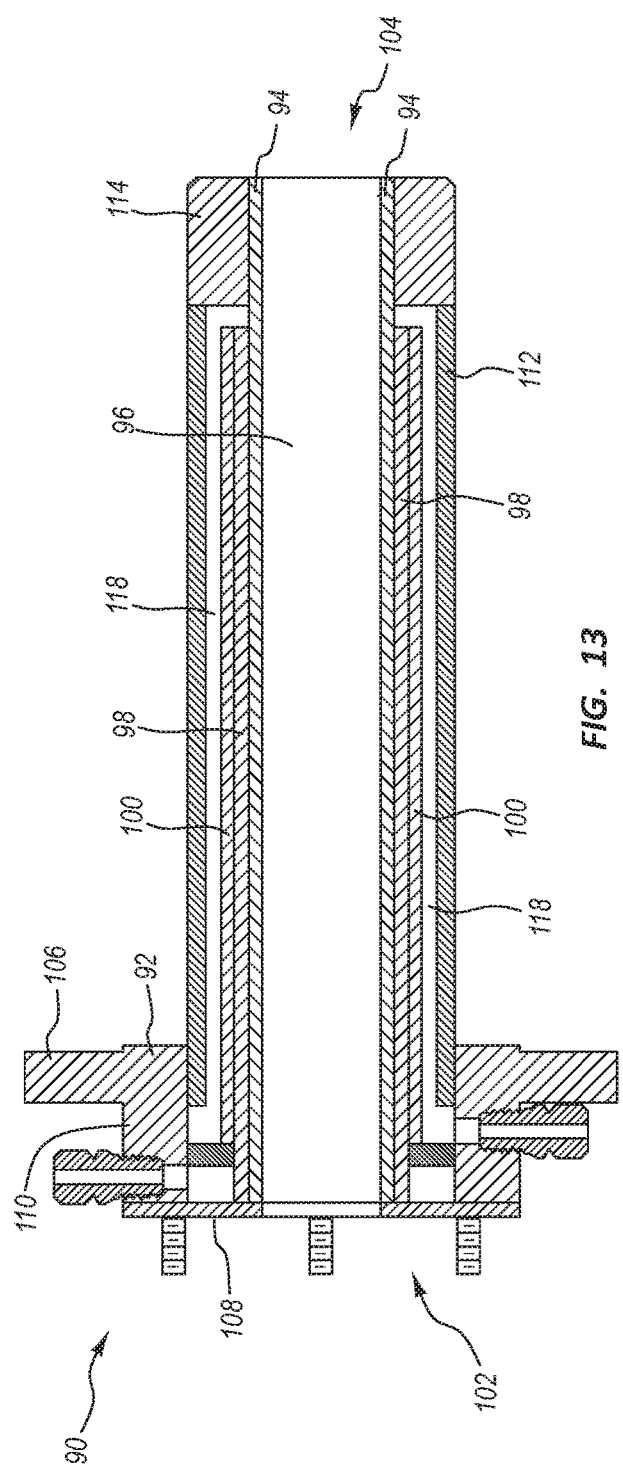
FIG. 13 shows a cross-sectional view of one embodiment of a feed adapter device along its longitudinal axis.
Figure 16:
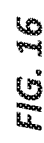
FIG. 16 shows a perspective view of one embodiment of a thermal collar configured to be positioned at the discharge end of the feed adapter device to facilitate heat transfer from the thermal process to the cooling fluid.
Figure 15:
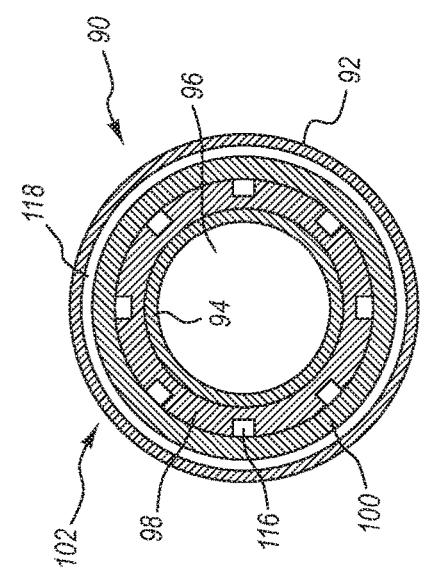
FIG. 15 shows a cross-sectional view of the feed adapter device in FIG. 13 along an axis that is transverse to the longitudinal axis of the device.
Figure 14:
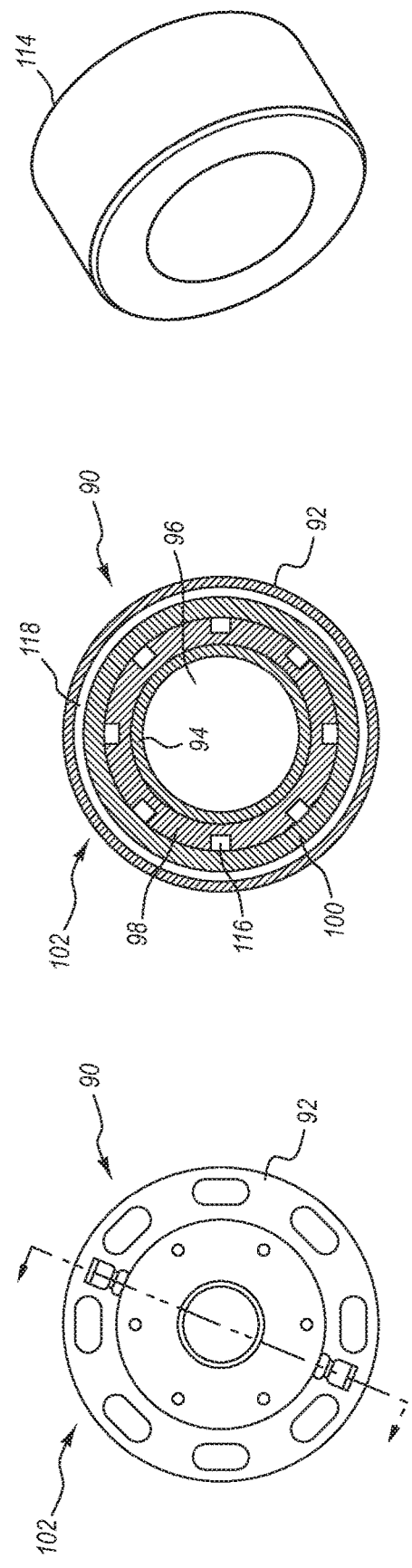
FIG. 14 shows a feed end view of the feed adapter device in FIG. 13.

FIGS. 13-15 show one embodiment of a feed adapter device 90 that may be used to prevent thermal induced reactions of a feed material as it is being fed into a high temperature unit operation. FIG. 13 shows a cross-sectional view of the feed adapter device 90 along its longitudinal axis. FIG. 14 shows an end view of the feed end of the feed adapter device 90. FIG. 15 shows a cross-sectional view along an axis that is transverse to the longitudinal axis of the feed adapter device 90. In the context of the system 20, the feed adapter device 90 may be used to feed the waste material into the fluidized bed reactor 34.

The feed adapter device 90 is configured to prevent the waste material from decomposing or otherwise reacting before it enters the fluidized bed reactor 34. It is especially suitable for use with the feeders 54, 72 to enable the DAW and the dewatered spent IER to be fed into the fluidized bed reactor 34 without undergoing any significant reactions before they enter the reactor 34. It may also be used with other feed streams such as slurry feed streams. However, slurries contain water that cools the feed stream before it reaches the fluidized bed reactor 34 thereby rendering the feed adapter device 90 largely superfluous.

One of the best locations for the waste material to enter the fluidized bed reactor 34 is in the lower portion of the fluidized bed. Examples of this are shown in FIGS. 2-3. This puts the feeders 54, 72 and the waste material in direct contact with the hottest zone in the fluidized bed reactor 34 making them susceptible to heat transfer from the fluidized bed.

It is undesired for the waste material to react in the feeders 54, 72 before physically entering the fluidized bed. Also, as explained above, it is undesirable to feed a coolant fluid such as water into the fluidized bed with the waste material. The feed adapter device 90 cools the waste material before it enters the fluidized bed. The feed adapter device 90 may be coupled to the feeders 54, 72 and extend through the wall or bottom of the fluidized bed reactor 34. As mentioned above, the feeders 54, 72 may be any suitable feeder including a high-torque screw feeder such as an extruder or the like. Also, the feed adapter device 90 may be actively cooled using a coolant fluid such as a coolant liquid or gas.

The feed adapter device 90 is configured to prevent thermal induced reactions in waste feed stream to a thermal process without introducing a cooling agent into the feed stream. This is accomplished by limiting the transfer of thermal energy from the process to the nozzle of the feed adapter device 90, removing thermal energy that is transferred to the nozzle, and removing thermal energy from the feed stream itself.

The feed adapter device 90 comprises a housing 92 surrounding a bore tube or bore sleeve 94, which defines a feed bore 96 through the device 90. The feed adapter 90 also includes a thermal core 98 surrounding the bore tube 94 and an isolator tube or ring 100 surrounding the thermal core 98. It also includes a feed end 102 and a discharge end 104. The thermal core 98 is configured to transfer heat away from the bore tube 94 and prevent the waste material from getting too hot and decomposing.

The housing 92 includes a process flange 106, a feed flange 108, a body 110, and a body extension 112. The body extension 112 includes a thermal collar or ring 114 positioned at the discharge end 104 of the feed adapter device 90. The thermal collar 114 is a relatively thick material that surrounds the bore tube 94 and extends all of the way out to the outer surface of the housing 92.

The process flange 106 is used to couple the feed adapter device 90 to the process reactor or vessel, in this case the fluidized bed reactor 34. The feed flange 108 is used to couple the feed adapter device 90 to the feed stream delivery equipment. For example, the feed flange 108 may be used to couple the feed adapter device to a screw-based feeding device such as an extruder without the die.

The body 110 couples the flanges 106, 108 together and provides containment for the cooling fluid. It also provides connection points for the supply and discharge lines of the cooling fluid and supports the body extension 112 and the bore tube 94. The configuration of the connection points may be varied as needed. The body 110 also has an internal volume which facilitates the flow of the cooling fluid into and out of the device 90. The body extension 112 is coupled to the process flange 106 and extends outward into the fluidized bed reactor 34. It also provides containment for the cooling fluid. It should be appreciated that the configurations of the body 110 and body extension 112 may be varied to meet various application requirements.

The bore tube 94 connects to the feed flange 108 and extends through the center of the housing body 110, the housing body extension 112, and the thermal collar 114. The bore tube 94 contains the feed stream and separates the feed stream from the cooling fluid. For feed systems that uses a screw feeder or extruder, the bore tube 94 becomes an extension of the bore of the screw feeder or extruder. Extended screws may be used that extend all the way through the bore tube 94 to the discharge end 104 of the feed adapter device 90. This way the waste material is engaged by the screw all the way through the device 90, including at the discharge end 104. The extended screws may include an integral cooling system. Also, one or more thermal or wear resistant coatings may be applied to the bore tube 94 to facilitate the passage of waste material through the feed bore 96.

Referring to FIGS. 13 and 15, the thermal collar 114 is positioned at the discharge end 104 of the feed adapter device 90. It is a ring that is part of the housing body extension 112 and supports the bore tube 94. The thermal collar 114 is at the terminus of the feed adapter device 90 where it interfaces with the thermal process and separates the cooling fluid from the thermal process. The thermal collar 114 may be coated with a thermal coating.

In operation, the thermal collar 114 acts as a thermal barrier that separates the thermal process from the waste feeding system 30, 73. One end or side of the thermal collar 114 is exposed to the thermal process and the other end or side is exposed to the cooling fluid. The thermal energy absorbed by the thermal collar 114 is conducted through the thermal collar 114 and then rejected to the cooling fluid. This may produce a temperature gradient along the length of the thermal collar 114 depending on the process and cooling conditions. Alternatively, the thermal collar 114 may be positioned in direct contact with the thermal core 98 in lieu of or in addition to the cooling fluid. In this embodiment, a thermally conductive agent may be used to transfer thermal energy from the thermal collar 114 to the thermal core 98.

The thermal core 98 is a tube or sleeve that has high thermal conductivity and is positioned in direct contact with the outside surface of the bore tube 94. The thermal core 98 extends from the cooling agent supply zone in the housing to the region adjacent to the thermal collar 114. The thermal core 98 has internal passages 116 along its length which direct the flow of the cooling fluid from the cooling fluid supply, along the length of the thermal core 98, and discharge the cooling fluid in jets that impinge upon the thermal collar 114.

The cooling fluid flows around the thermal core 98 and back through the channel or cavity 118 in the housing body extension 112 where it is discharged from the device 90. The cooling fluid removes thermal energy from the thermal core 98 as it flows back through the channel 118. The thermal core 98, which is in direct contact with the bore tube 94, removes thermal energy from the bore tube 94, which removes thermal energy from the process feed stream.

The isolator tube 100 surrounds the thermal core 98 and keeps the incoming cooling fluid in the passages 116 separate from the outgoing cooling fluid in the channel 118. In effect, the isolator tube 100 devices the internal volume of the device 90 into two zones. One is for supplying cooling fluid and includes the passages 116. The other is for removing and discharging the cooling fluid and includes the channel 118.

The cooling fluid or cooling agent may be any suitable thermal transfer fluid in either liquid or vapor phase. Examples of suitable liquid cooling fluids include, but are not limited to: service water, condenser water, chilled water, and the like. Examples of gas cooling fluids include, but are not limited to: nitrogen, argon, freon, compressed air, and the like. The coolant fluid may undergo a liquid/vapor phase change to increase thermal performance.

EXAMPLES

The following examples are provided to further illustrate the disclosed subject matter. They should not be used to constrict or limit the scope of the claims in any way.

Example 1

In this Example, a thermal volume reduction process was tested using a dewatered ion exchange resin (IER) feed and an IER slurry feed to determine how the different feeds affected the process. The dewatered IER feed had a water content of approximately 55% and was fed into the fluidized bed reactor using a screw extruder without a die. The IER slurry feed had a water content of approximately 85% and was fed into the fluidized bed reactor using a peristaltic pump. The diameter of the fluidized bed reactor was 15 inches.

The IER slurry feed was tested in a single run. The dewatered IER feed was tested in two runs with the feed rate of the second run being 50% greater than the feed rate of the first run. The results of the tests are shown in Table 1 below.

TABLE 1

IER Feed Options: IER Slurry vs. Dewatered IER

|  | IER Feed Rate ($m^3$/hr) | IER Water Content (wt %) | AA Feed Rate (kg/hr) |
|---|---|---|---|
| IER Slurry | 0.04 | 85 | 2.9 |
|  |  |  | 4.4 water |
| Dewatered IER Run 1 | 0.02 | 55 | 2.9 |
| Dewatered IER Run 2 | 0.03 | 55 | 4.5 |

|  | Charcoal Feed Rate (kg/hr) | Reformed Residue Prod. Rate (kg/hr) | Volume Reduction |
|---|---|---|---|
| IER Slurry | 4.1 | 2.9 | 7:1 to 8:1 |
| Dewatered IER Run 1 | 1.6 | 2.8 | 7:1 to 8:1 |
| Dewatered IER Run 2 | 3.2 | 3.8 | 7:1 to 8:1 |

The data shows that feeding dewatered IER into the fluidized bed reactor provides at least two advantages. First, it allows the charcoal feeding rate to be significantly reduced. This lowers the cost of the process and minimizes the negative impact on the volume reduction of the waste due to impurities in the charcoal. Second, it increases the throughput of a given size of fluidized bed reactor compared to sluicing IER.

Example 2

In this Example, a thermal volume reduction process was tested using different feed compositions to determine how they affect the process. The feed compositions tested were: (1) an IER slurry feed, (2) a dry active waste (DAW) feed, (3) a mixture of DAW and IER (DAW and IER were mixed before entering the fluidized bed reactor), and (4) continuously co-feeding DAW and IER into the fluidized bed reactor (DAW and IER were fed separately fed into the reactor). Feed 1 was pumped into the fluidized bed reactor and feeds 2-4 were screw-fed into the fluidized bed reactor using an extruder without a die. The results of the tests are shown in Table 2 below.

TABLE 2

Feed Composition Comparison

|  | Feed Radioactivity ($Bq/m^3$) | Feed Rate ($m^3$/hr) | Charcoal Feed Rate (kg/hr) |
|---|---|---|---|
| IER Slurry | $5.2 \times 10^{12}$ | 0.04 | 4.1 |
| DAW Only | $2.19 \times 10^9$ | 0.10 | 0 |
| DAW/IER Mixture | $5.2 \times 10^{12}$ (IER) $2.19 \times 10^9$ (DAW) | 0.04 (IER) 0.007 (DAW) | 0 |
| Continuous Co-feeding of DAW and IER | $5.2 \times 10^{12}$ (IER) $2.19 \times 10^9$ (DAW) | 0.10 (DAW) 0.005 (IER) | 0 |

|  | Reformed Residue Prod. Rate (kg/hr) | Volume Reduction | Reformed Residue Radioactivity ($Bq/m^3$) |
|---|---|---|---|
| IER Slurry | 2.9 | 7:1 to 8:1 | $3.7 \times 10^{13}$ |
| DAW Only | 0.004 | 16:1 | $5.4 \times 10^{10}$ |
| DAW/IER Mixture | 0.006 | 16:1 | $3.5 \times 10^{13}$ |
| Continuous Co-feeding of DAW and IER | 0.005 | 17:1 | $5.6 \times 10^{12}$ |

The data shows that processing DAW and IER together provides at least two advantages. First, it does not require the addition of any charcoal during steady state operation. This lowers the cost of the process and minimizes the negative impact on the volume reduction of the waste due to impurities in the charcoal. Second, the radioactivity of the reformed residue (RR) produced by the combination of DAW and IER was lower than IER alone. This demonstrates that processing the two wastes together provides some flexibility in controlling the radioactivity of the final package. This could be useful in situations where the radioactivity level of incoming wastes from a nuclear power plant vary substantially.

Example 3

In this Example, the ability to successfully feed dry active waste (DAW) into the fluidized bed reactor of a thermal volume reduction process was tested. The conventional method for feeding DAW into a fluidized bed reactor is to combine it with water to form a slurry that is then fed into the reactor. The water acts as a cooling agent to prevent the DAW from reacting before entering the fluidized bed reactor. This test was performed to determine whether DAW may be fed into the reactor without it being in the form of a slurry.

A feed adapter device was used to connect a screw extruder to the fluidized bed reactor. The feed adapter device extended 13.5 inches through the wall of the fluidized bed reactor, which included a metal exterior wall and an interior refractory liner. The shell of the feed adapter device included interior fluid channels through which coolant fluid was circulated to cool the device. The coolant fluid was supplied at a temperature of −3° C. and circulated at a rate of 5 gpm. In general, the configuration of the feed adapter device is similar or identical to that shown and described in the drawings.

The fluidized bed reactor was operated at 900° C. for over 50 hours while a series of process tests were performed. The operating temperature was at the top of the normal operating temperature of the reactor, which is approximately 700 to approximately 900° C. A 2-inch extruder without the die was used to feed DAW through the feed adapter device and into the fluidized bed reactor. The nozzle or discharge port of the feed adapter device was inside the interior wall of the fluidized bed reactor with the front directly facing the hot fluidizing bed.

The section of the feed adapter device extending through the wall of the fluidized bed reactor experienced a temperature gradient from 220° C. at the outer surface of the wall of the reactor to 900° C. at the inside surface of the refractory liner. The feed adapter device was heated through conductive heat transfer from the wall of the fluidized bed reactor as well as from radiation heat transfer from the fluidized bed area that it was facing.

No melting was observed in the extruder itself and no melting or charring residues were observed in the nozzle of the feed adapter device. There was some discoloration on the end of the nozzle, which was due to condensation of some heavy hydrocarbon vapor that intruded into the area between the exterior wall of the nozzle and the wall of the port into the fluidized bed reactor. Overall, however, the results showed that the feed adapter device successfully shielded the DAW waste feed as it was fed into the reactor.

Example 4

In this Example, a thermal volume reduction process was tested using different DAW feed compositions and process conditions to determine how they affect the process. Three types of feeds were tested. Two of the feeds included DAW only (Feed types A and B) and one included a combination of DAW and IER (Feed type C). The process included a fluidized bed reactor, a cyclone separator positioned downstream of the reactor, and a high temperature filter positioned downstream of the high temperature reactor. The process was operated either in a one-pass mode where none of the solids were recirculated from the cyclone back to the fluidized bed reactor and a partial recirculating mode where some of the solids were recirculated from the cyclone to the fluidized bed reactor. The process conditions for each test as well as the results are shown in Table 3A and Table 3B.

TABLE 3A

Thermal Volume Reduction Test Conditions

| Test No. | Feed Type[1] | Feed Rate (g/min) | Bed Temp (° C.) | Extruder Temp[2] (° C.) | Coolant Exit Temp[3] (° C.) | Bed Height (in) | SSV[4] (fps) | Process Mode | Steam Feed (mol/min) |
|---|---|---|---|---|---|---|---|---|---|
| 1 | A | 300 | 850 | 5-10 | 20-25 | 40 | 1.6 | OP | 21 |
| 2 | A | 300 | 900 | 5-10 | 20-30 | 40 | 1.6 | OP | 20 |
| 3 | A | 300 | 900 | 5-10 | 20-30 | 50 | 1.1 | OP | 8 |
| 4 | B | 300 | 900 | 5-10 | 20-30 | 50 | 1.2 | OP | 9 |
| 5 | A | 300 | 750 | 5-10 | 15-20 | 50 | 1.7 | OP | 30 |
| 6 | A | 300 | 750 | 5-10 | 15-20 | 50 | 1.7 | OP | 25 |
| 7 | A | 300 | 750 | 5-10 | 15-20 | 50 | 2.0 | PR | 36 |
| 8 | A | 300 | 750 | 5-10 | 15-20 | 50 | 2.0 | PR | 30 |
| 9 | C | 300 | 750 | 5-10 | 15-20 | 50 | 1.7 | OP | 28 |
| 10 | C | 300 | 750 | 5-10 | 15-20 | 50 | 2.1 | PR | 36 |
| 11 | C | 300 | 700 | 5-10 | 15-20 | 50 | 2.0 | PR | 40 |

[1]Feed type compositions: Feed type A (DAW): 38 wt % plastic, 28 wt % cloth, 26 wt % paper, 4 wt % wood, 4 wt % rubber. Feed type B (DAW): 60 wt % plastic, 35 wt % cloth, 5 wt % rubber. Feed type C (DAW + IER): 80 wt % Feed Type A, 20 wt % IER (IER water content was 55 wt %).
[2]Temperature of the extruder chamber surface.
[3]The temperature of the coolant measured at the location it exits the feed adapter device.
[4]Steady state velocity.

TABLE 3B

Thermal Volume Reduction Test Conditions (cont.)

| Test No. | $O_2$ Feed (mol/min) | $N_2$ Feed (mol/min) | SS Run Time[5] (hrs) | Carbon in RR (wt %) | WR[6] | $O_2$[7] (%) | $CO_2$[7] (%) | $CO$[7] (%) | $H_2$[7] (%) | $CH_4$[7] (%) | Dioxin (ng/Nm³) |
|---|---|---|---|---|---|---|---|---|---|---|---|
| 1 | 11 | 4 | 5 | 36 | 20:1 | 1 | 53 | 11 | 4 | 19 | 0.3 |
| 2 | 10 | 4 | 8 | 40 | 18:1 | 0.1 | 48 | 10 | 8 | 10 | 0.5 |
| 3 | 9 | 7 | 6 | 30 | 24:1 | 1 | 41 | 10 | 4 | 13 | 0.4 |
| 4 | 9 | 7 | 6 | 31 | 24:1 | 0.5 | 47 | 12 | 10 | 18 | 0.7 |
| 5 | 5 | 6 | 6 | 51 | 15:1 | 0 | 38 | 11 | 8 | 24 | 0 |
| 6 | 10 | 6 | 6 | 45 | 25:1 | 0.2 | 47 | 10 | 4 | 18 | 0.1 |
| 7 | 6 | 7 | 8 | 20 | 35:1 | 0 | 30 | 16 | 8 | 28 | 0 |
| 8 | 6 | 7 | 8 | 10 | 50:1 | 0 | 46 | 8 | 2 | 26 | 0 |
| 9 | 7 | 6 | 6 | 34 | 17:1 | 0 | 36 | 14 | 4 | 15 | 0 |
| 10 | 9 | 6 | 8 | 15 | 11:1 | 0 | 34 | 14 | 5 | 19 | 0 |
| 11 | 7 | 6 | 8 | 25 | 18:1 | 0 | 40 | 12 | 4 | 20 | 0 |

[5]SS = steady state.
[6]Weight reduction calculated as the feed mass flow rate (total feed weight running at steady state) divided by the reformed residue (collected from both cyclone and high-temperature filter) and expressed as a ratio.
[7]The percentages of synthesized gas are expressed as the weight percent on a dry basis (steam excluded) as measured downstream of the high-temperature filter.

The results reveal a number of notable aspects of the process. One is that no additional fuels were necessary for steady-state operation of the process under any of the process conditions including those where the feed includes IER. Another is that there was negligible dioxin formation when the process operated at a temperature of 700-750° C. Yet another is that operating the fluidized bed in a partially recirculating condition significantly improved the reduction and carbon conversion compared to one-pass operation. The results also indicate that there is potential to further optimize the volume/weight reduction of the waste by optimizing the operating parameters of the system and/or further altering its design by, for example, operating the fluidized bed reactor in a fully recirculating condition.

The results show that when the reactor was more oxygen deficient, the carbon conversion was not as high as when the reactor was operating at a less reducing condition. However, at the higher reactor temperatures—i.e., 850-900° C.)—more oxygen (and thus higher degree of oxidation) was required to provide energy to maintain the high temperature of the fluidized bed. There was some dioxin formation at higher temperature operation. Nevertheless, the dioxin levels at the point of discharge to atmosphere for these conditions were all below 0.05 ng/dscm. There was some undesired accumulation of calcium compounds in the cyclone observed at the higher reactor temperatures—i.e., 850-900° C.).

Illustrative Embodiments

Reference is made in the following to several illustrative embodiments of the disclosed subject matter. The following embodiments illustrate only a few selected embodiments that may include one or more of the various features, characteristics, and advantages of the disclosed subject matter. Accordingly, the following embodiments should not be considered as being comprehensive of all possible embodiments.

A method may comprise reducing the volume of radioactive waste from a nuclear facility. The radioactive waste may include spent IER and/or DAW. The method may be used to reduce the volume of only spent IER, only DAW, or both IER and DAW together.

The DAW may be size reduced and fed into a fluidized bed reactor using a high-torque screw feeder or extruder (without the extrusion die). The spent IER may be pumped into the fluidized bed reactor as a slurry. The waste streams may be gasified in the reactor with an inert bed, which is fluidized primarily by superheated steam.

The waste may be reacted in the fluidized bed reactor under reducing conditions. An anti-agglomeration material such as an aluminum compound or an iron compound may be added to the fluidized bed to prevent agglomeration and help stabilize the waste. The produced gas and the entrained solid particles may be separated by a cyclone and then further by a high temperature filter. The collected solids have the majority of the radioactivity in the unprocessed waste feed, but in a significantly reduced volume, and are safe for storage or disposal. The solids may also be captured by the high-temperature filter alone without the use of the cyclone.

The gas stream is further processed through an off-gas treatment system comprising a thermal oxidizer that oxidizes $H_2$, $CO$, $H_2S$, $CH_4$ and other hydrocarbons, a scrubber system that quickly quenches the gas stream and removes acid gaseous components such as $HCl$, $SO_2$, and a filter system for final gas purification before it is emitted into the atmosphere.

The fluidized bed reactor includes a complex reaction network, including pyrolysis and steam reforming. The reactor is maintained at a suitable redox condition by controlling oxygen fugacity or concentration, which ensures energy for maintaining the reaction temperature.

The process may be operated at a negative pressure to prevent leakage of radioactive particles and/or gases. The system pressure may be controlled based on the freeboard of the fluidized bed reactor. In one embodiment, the pressure is approximately −50 inches of water (approximately −12.5 kPa) to approximately −25 inches water (approximately −6 kPa).

The reaction temperature of the fluidizing bed may be approximately 650° C. to approximately 800° C. or, preferably, approximately 725° C. to approximately 750° C. The reaction may take place in the fluidized bed region, which has the highest temperature in the fluidized bed reactor. It may be desirable for the temperature to not exceed approximately 800° C. to prevent volatilization of Cs and Tc.

The method may be operated in a way that does not rely on the addition of fuel during normal or steady state operation. The method may also be operated in a way that relies on extra fuel such as charcoal to maintain an elevated temperature at steady state, during startup, and/or during hot standby.

The redox condition of the reaction in the fluidized bed reactor may be adjusted by adjusting the amount of oxygen added to the reactor. In the post-reaction gas stream, the volumetric concentration of oxygen may be controlled to less than 1 vol %, the volumetric concentration of hydrogen may be below 4 vol %, the volumetric concentration of methane may be below 5 vol %, and the volumetric concentration of carbon monoxide may be below 10 vol %. Doing this may help ensure safe operation of the fluidized bed reactor.

The reaction condition may alternatively be controlled to produce even greater reducing conditions (even less oxygen input). The volumetric concentration of hydrogen may be above 10 vol %, carbon monoxide may be above 4 vol %, methane may be above 5 vol %, and there may be no measurable oxygen. Hydrogen, carbon monoxide, methane and other hydrocarbons are essentially fuel for the thermal oxidizer. The thermal oxidizer may be operated without additional fuel input when the steam reformer is operated at highly reducing conditions and the resulting product gas has high fuel content.

The Oxygen and superheated steam may be fed together through a fluidizing gas distributor into the fluidized bed reactor. Alternatively, the oxygen may be fed into the fluidized bed reactor at a location slightly above the waste feed entrance. Another alternative is to simultaneously feed oxygen into the fluidized bed reactor at both of the two above-mentioned positions, in a reduced quantity at each position. Another alternative is to feed oxygen into the fluidized bed reactor at both of the above-mentioned locations as well as at one or more additional locations with the supply at each location reduced so that the total oxygen added remains the same. This may be especially useful when the fluidized bed reactor is operating in the fully recirculating mode.

The spent IER may be fed in the fluidized bed reactor in a dewatered form. This may be done using a high-torque screw feeder (e.g., an extruder without the die). This feeding method is not subject to a minimal feed rate limit like a slurry so it may be continuously fed into the fluidized bed reactor in small amounts with the DAW. This makes the process more flexible. The relative feed quantities of the DAW and spent IER may be adjusted to adjust the radioactivity of the final waste package.

The feeder 54 for the DAW may be coupled to the side wall of the fluidized bed reactor in a horizontal arrangement. The DAW may also be fed vertically through the bottom of the fluidized bed reactor using one or more screw feeders—e.g., one screw feeder transports the DAW primarily laterally to the underside of the reactor and another screw feeder transports it upward vertically through the bottom of the reactor. For any DAW feeding arrangement, the entry point of the DAW feed may be above the distributor of the fluidizing gas. The screw feeder may be capable of producing high torque. One suitable screw feeder is an extruder without a die on the end.

The volume-reduction steam reforming process may be operated using a fully circulating fluidized bed reactor system. The fluidized bed material makes the trip through the FBR together with the feed, the intermediate and the reformed residue. The cyclone separates the majority of the solids and returns them to the fluidized bed reactor. The solids keep circulating through the fluidized be reactor until they are too small and/or too light to be separated by the cyclone.

The process may also be operated using a partially circulating fluidized bed reactor system. In the partial recirculating fluidized bed process, most of the fluidized bed materials are not elutriated from the fluidized bed reactor. The solids captured by the cyclone(s) are returned to the fluidized bed reactor for reprocessing. The recirculation continues until the solids get too small/light to be separated by the cyclone.

For a one-pass through system, the superficial space velocity of the fluidizing gas may be approximately 1.1 ft/s to approximately 2.0 ft/s (approximately 33.5 cm/s to approximately 61 cm/s) or, preferably, approximately 1.4 ft/s to approximately 1.6 ft/s (approximately 42.5 cm/s to approximately 49 cm/s). For the fully recirculating system, the superficial space velocity of the fluidizing gas may be approximately 4 ft/s to approximately 6 ft/s (approximately 122 cm/s to approximately 183 cm/s). For the partially recirculating system, the superficial space velocity of the fluidizing gas may be approximately 2 ft/s to approximately 4 ft/s (approximately 61 cm/s to approximately 122 cm/s).

The feeder may be coupled to the fluidized bed reactor with a feed adapter device configured to minimize the thermal impact of the high temperature process on the materials in the feeder, thereby ensuring the process smoothness and integrity. The feed adapter device may be used for all high temperature thermal processes where cooling is needed for a directly attached and/or penetrating process connection.

The high-temperature filter may comprise multiple filter elements and/or use an outside-in flow pattern. The solids may be retained on the outer surface of the filter element. The filter element may be periodically back-pulsed with nitrogen. The wall of the bottom cone section may have mechanical tongs or chains configured to break any bridged particles. A high-pressure gas flow may also be used to break any bridged particles. The high-pressure gas flow may be provided via the down-corner tubes around the perimeter of the filter or via pores located on the wall of the cone. A vibration device may also be applied to the external surface of the cone.

An anti-agglomerating material such as an aluminum or iron ($Fe^{3+}$) compound may be added to the fluidized bed to prevent agglomeration of the waste and help further stabilize the waste. The molar ratio of Al or Fe to the problematic alkali metal(s) may be approximately 0.2 to approximately 1.5 or, preferably, approximately 0.8 to approximately 1.1. The alkali content of the waste may be determined before the waste is fed into the fluidized bed reactor.

The size of any solid waste such as DAW may be reduced and/or standardized before the waste is fed into the fluidized bed reactor. For example, the size of the solid waste may be reduced to no more than approximately 1 inch approximately 2.54 cm) or, preferably, approximately 0.5 inches to approximately 0.75 inches (approximately 1.27 cm to approximately 1.9 cm), especially for one-pass through configurations.

The process may include a wind box where fuel (e.g., natural gas) is combusted in the wind box). The hot combustion gas from the wind box may be used to provide energy to the fluidized bed reactor as well as serve as the fluidizing gas.

The hot exhaust gas from the thermal oxidizer may be recycled and used in whole or in part as a source of the fluidizing gas for the fluidized bed reactor. The exhaust gas from the thermal oxidizer (with steam as one of the main two ingredients) may be split into a recycle gas stream and a bleed stream. The recycle loop goes to the fluidizing gas distributor. The recycle loop may be insulated and kept as short as possible to minimize heat loss. The bleed stream may go to the scrubber system for temperature quenching and acid gas scrubbing. This configuration may significantly save energy, reduce water consumption, and reduce the overall plant emission volume.

A higher temperature process can be used to treat VLLW DAW to prevent the organic material from condensing and/or depositing on the process equipment before reaching the thermal oxidizer. For example, the fluidized bed reactor can be configured to can operate at a temperature of approximately 600° C. to approximately 1100° C., approximately 850° C. to approximately 1100° C., approximately 900° C. to approximately 1100° C., or approximately 950° C. to approximately 1100° C.

It should be noted that it is generally undesirable to process spent IER at these temperatures because it will volatilize the radionuclides. However, the higher temperatures are advantageous when processing DAW because it has a low radionuclide content and the higher temperatures prevent the organic material in the DAW from condensing on the process equipment as a sticky residue. The few radionuclides in the DAW may be captures in the downstream gas filtration processes.

In order to run at these higher temperatures, the process and/or system components, especially those between the fluidized bed reactor and the thermal oxidizer, may be fabricated using high-temperature alloys such as Haynes 556, Inconel 617, Haynes 230, and the like and/or include refractory heat shields. Also, the use of refractory heat shields may make it possible to fabricate the process equipment from less exotic and/or less expensive materials and include a heat trace made of, for example, nichrome alloy.

A process where the temperature is increased to approximately 600° C. to 1100° C. when treating VLLW DAW such that condensable oils and volatiles are transported to the TOX for ultimate destruction removing the waste and hazard from potential condensation within the process/system. To achieve this, the process/system components including and between the FBRS and the Thermal Oxidizer (TOX) may be fabricated to specific design from high temperature alloys such as, but not limited to, Haynes 556, Inconel 617, Haynes 230 and/or include refractory heat shields to facilitate use of less exotic/expensive materials and insulating heat trace such as, but not limited to, nichrome alloy. This includes design cognizance of chemical and mechanical corrosion/erosion of the process/system materials and specific design modification to mitigate said corrosion/erosion.

Terminology and Interpretative Conventions

The term "coupled" means the joining of two members directly or indirectly to one another. Such joining may be stationary in nature or movable in nature. Such joining may be achieved with the two members or the two members and any additional intermediate members being integrally formed as a single unitary body with one another or with the two members or the two members and any additional intermediate member being attached to one another. Such joining may be permanent in nature or alternatively may be removable or releasable in nature.

The term "coupled" includes joining that is permanent in nature or releasable and/or removable in nature. Permanent joining refers to joining the components together in a manner that is not capable of being reversed or returned to the original condition. Releasable joining refers to joining the components together in a manner that is capable of being reversed or returned to the original condition.

Any methods described in the claims or specification should not be interpreted to require the steps to be performed in a specific order unless stated otherwise. Also, the methods should be interpreted to provide support to perform the recited steps in any order unless stated otherwise.

Spatial or directional terms, such as "left," "right," "front," "back," and the like, relate to the subject matter as it is shown in the drawings. However, it is to be understood that the described subject matter may assume various alternative orientations and, accordingly, such terms are not to be considered as limiting.

Articles such as "the," "a," and "an" may connote the singular or plural. Also, the word "or" when used without a preceding "either" (or other similar language indicating that "or" is unequivocally meant to be exclusive—e.g., only one of x or y, etc.) shall be interpreted to be inclusive (e.g., "x or y" means one or both x or y).

The term "and/or" shall also be interpreted to be inclusive (e.g., "x and/or y" means one or both x or y). In situations where "and/or" or "or" are used as a conjunction for a group of three or more items, the group should be interpreted to include one item alone, all the items together, or any combination or number of the items.

The terms have, having, include, and including should be interpreted to be synonymous with the terms comprise and comprising. The use of these terms should also be understood as disclosing and providing support for narrower alternative embodiments where these terms are replaced by "consisting" or "consisting essentially of."

Unless otherwise indicated, all numbers or expressions, such as those expressing dimensions, physical characteristics, and the like, used in the specification (other than the claims) are understood to be modified in all instances by the term "approximately." At the very least, and not as an attempt to limit the application of the doctrine of equivalents to the claims, each numerical parameter recited in the specification or claims which is modified by the term "approximately" should be construed in light of the number of recited significant digits and by applying ordinary rounding techniques.

All disclosed ranges are to be understood to encompass and provide support for claims that recite any and all subranges or any and all individual values subsumed by each range. For example, a stated range of 1 to 10 should be considered to include and provide support for claims that recite any and all subranges or individual values that are between and/or inclusive of the minimum value of 1 and the maximum value of 10; that is, all subranges beginning with a minimum value of 1 or more and ending with a maximum value of 10 or less (e.g., 5.5 to 10, 2.34 to 3.56, and so forth) or any values from 1 to 10 (e.g., 3, 5.8, 9.9994, and so forth).

All disclosed numerical values are to be understood as being variable from 0-100% in either direction and thus provide support for claims that recite such values or any and all ranges or subranges that may be formed by such values. For example, a stated numerical value of 8 should be understood to vary from 0 to 16 (100% in either direction) and provide support for claims that recite the range itself (e.g., 0 to 16), any subrange within the range (e.g., 2 to 12.5) or any individual value within that range (e.g., 15.2).

The drawings shall be interpreted as illustrating one or more embodiments that are drawn to scale and/or one or more embodiments that are not drawn to scale. This means the drawings may be interpreted, for example, as showing: (a) everything drawn to scale, (b) nothing drawn to scale, or (c) one or more features drawn to scale and one or more features not drawn to scale. Accordingly, the drawings may serve to provide support to recite the sizes, proportions, and/or other dimensions of any of the illustrated features either alone or relative to each other. Furthermore, all such sizes, proportions, and/or other dimensions are to be understood as being variable from 0-100% in either direction and thus provide support for claims that recite such values or any and all ranges or subranges that may be formed by such values.

The terms recited in the claims should be given their ordinary and customary meaning as determined by reference to relevant entries in widely used general dictionaries and/or relevant technical dictionaries, commonly understood meanings by those in the art, etc., with the understanding that the broadest meaning imparted by any one or combination of these sources should be given to the claim terms (e.g., two or more relevant dictionary entries should be combined to provide the broadest meaning of the combination of entries, etc.) subject only to the following exceptions: (a) if a term is used in a manner that is more expansive than its ordinary and customary meaning, the term should be given its ordinary and customary meaning plus the additional expansive meaning, or (b) if a term has been explicitly defined to have a different meaning by reciting the term followed by the phrase "as used in this document shall mean" or similar language (e.g., "this term means," "this term is defined as," "for the purposes of this disclosure this term shall mean," etc.). References to specific examples, use of "i.e.," use of the word "invention," etc., are not meant to invoke exception (b) or otherwise restrict the scope of the recited claim terms. Other than situations where exception (b) applies, nothing contained in this document should be considered a disclaimer or disavowal of claim scope.

The subject matter recited in the claims is not coextensive with and should not be interpreted to be coextensive with any embodiment, feature, or combination of features described or illustrated in this document. This is true even if only a single embodiment of the feature or combination of features is illustrated and described in this document.

INCORPORATION BY REFERENCE

The entire contents of each of the documents listed below are incorporated by reference into this document. If the same term is used in both this document and one or more of the incorporated documents, then it should be interpreted to have the broadest meaning imparted by any one or combination of these sources unless the term has been explicitly defined to have a different meaning in this document. If there is an inconsistency between any of the following documents and this document, then this document shall govern. The incorporated subject matter should not be used to limit or narrow the scope of the explicitly recited or depicted subject matter.

U.S. Prov. App. No. 62/422,990, titled "Thermal Volume Reduction of Radioactive Wastes," filed on 16 Nov. 2016.

The invention claimed is:

1. A method of decomposing dewatered waste material contaminated with radionuclides in a fluidized bed reactor, the method comprising:
    feeding the dewatered waste material into the fluidized bed reactor;
    injecting fluidizing gas into the fluidized bed reactor to fluidize bed media and form a fluidized bed in the fluidized bed reactor, the fluidizing gas comprising superheated steam; and
    decomposing the dewatered waste material in the fluidized bed reactor;
    wherein the dewatered waste material is not fed into the fluidized bed reactor in a slurry.

2. The method of claim 1 wherein the dewatered waste material comprises spent ion exchange resin and/or spent granular activated carbon.

3. The method of claim 2 wherein the spent ion exchange resin and/or the spent granular activated carbon have a water content of no more than 70 wt %.

4. The method of claim 1 comprising feeding the dewatered waste material into the fluidized bed reactor using a screw mechanism.

5. The method of claim 1 comprising adding an anti-agglomeration additive to the dewatered waste material before feeding it into the fluidized bed reactor.

6. The method of claim 1 comprising injecting oxygen into the fluidized bed reactor.

7. The method of claim 1 comprising operating the fluidized bed reactor at a temperature of approximately 650° C. to approximately 850° C.

8. The method of claim 1 comprising separating solids from a gas stream exiting the fluidized bed reactor and circulating the solids back to the fluidized bed reactor.

9. A method of co-processing spent ion exchange resin and dry active waste in a fluidized bed reactor, the method comprising:
    feeding the spent ion exchange resin into the fluidized bed reactor;
    feeding the dry active waste into the fluidized bed reactor;
    injecting fluidizing gas into the fluidized bed reactor to fluidize bed media and form a fluidized bed in the fluidized bed reactor, the fluidizing gas comprising superheated steam; and
    decomposing the spent ion exchange resin and the dry active waste in the fluidized bed reactor;
    wherein the spent ion exchange resin is not fed into the fluidized bed reactor in a slurry.

10. The method of claim 9 comprising feeding the spent ion exchange resin and the dry active waste into the fluidized bed reactor using one or more screw mechanisms.

11. The method of claim 9 comprising feeding an anti-agglomeration additive into the fluidized bed reactor.

12. The method of claim 9 comprising injecting oxygen into the fluidized bed reactor.

13. The method of claim 9 comprising operating the fluidized bed reactor at a temperature of approximately 650° C. to approximately 850° C.

14. The method of claim 9 comprising separating solids from a gas stream exiting the fluidized bed reactor and circulating the solids back to the fluidized bed reactor.

15. The method of claim 9 wherein the spent ion exchange resin is dewatered spent ion exchange resin.

16. The method of claim 9 wherein the spent ion exchange resin has a water content of no more than 70 wt %.

17. A method of decomposing waste material contaminated with radionuclides in a fluidized bed reactor, the method comprising:
    feeding the waste material through a feed adapter device into the fluidized bed reactor operating at a temperature of approximately 650° C. to approximately 850° C., the feed adapter device extending through a wall of the fluidized bed reactor;
    cooling the feed adapter device by circulating a coolant fluid through the feed adapter device;
    injecting fluidizing gas into the fluidized bed reactor to fluidize bed media and form a fluidized bed in the fluidized bed reactor, the fluidizing gas comprising superheated steam; and
    decomposing the waste material in the fluidized bed reactor.

18. The method of claim 17 comprising moving the waste material through the feed adapter device using a screw mechanism.

19. The method of claim 17 wherein the feed adapter device comprises a discharge end through which the waste material enters the fluidized bed reactor, wherein the discharge end includes a thermal collar having one side that faces the interior of the fluidized bed reactor and an opposite side that contacts the coolant fluid.

20. The method of claim 17 wherein the waste material comprises spent ion exchange resin contaminated with radionuclides.

21. The method of claim 17 comprising steam reforming the waste material in the fluidized bed reactor.

22. A method of decomposing dry active waste material contaminated with radionuclides in a fluidized bed reactor, the method comprising:
    feeding the dry active waste material into the fluidized bed reactor operating at a temperature of approximately 800° C. to approximately 1100° C.;
    injecting fluidizing gas into the fluidized bed reactor to fluidize bed media and form a fluidized bed in the fluidized bed reactor, the fluidizing gas comprising superheated steam; and
    decomposing the dry active waste material in the fluidized bed reactor.

* * * * *

UNITED STATES PATENT AND TRADEMARK OFFICE
CERTIFICATE OF CORRECTION

| | | |
|---|---|---|
| PATENT NO. | : 10,573,423 B2 | Page 1 of 1 |
| APPLICATION NO. | : 15/815201 | |
| DATED | : February 25, 2020 | |
| INVENTOR(S) | : Scott D. Poole et al. | |

It is certified that error appears in the above-identified patent and that said Letters Patent is hereby corrected as shown below:

On the Title Page

Item (71) Applicant, delete "Columbia, SC (US)" and replace with --Tampa, FL (US)--.

Signed and Sealed this
First Day of October, 2024

Katherine Kelly Vidal
*Director of the United States Patent and Trademark Office*